US 11,783,805 B1

United States Patent
Nadig et al.

(10) Patent No.: US 11,783,805 B1
(45) Date of Patent: Oct. 10, 2023

(54) VOICE USER INTERFACE NOTIFICATION ORDERING

(71) Applicant: Amazon Technologies, Inc., Seattle, WA (US)

(72) Inventors: Vinaya Nadig, Bothell, WA (US); Samarth Bhargava, Redmond, WA (US); Bhaskara Kiran Kumar Kommalapati, Redmond, WA (US); Zheng Zheng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 17/026,945

(22) Filed: Sep. 21, 2020

(51) Int. Cl.
| | |
|---|---|
| *G10L 13/04* | (2013.01) |
| *G06F 9/54* | (2006.01) |
| *G10L 15/26* | (2006.01) |
| *G10L 13/08* | (2013.01) |
| *G06F 16/9032* | (2019.01) |

(52) U.S. Cl.
CPC .............. *G10L 13/04* (2013.01); *G06F 9/542* (2013.01); *G10L 13/08* (2013.01); *G10L 15/26* (2013.01); *G06F 16/90332* (2019.01)

(58) Field of Classification Search
CPC ......... G10L 13/04; G10L 13/08; G10L 15/26; G06F 9/542; G06F 16/90332
See application file for complete search history.

(56) References Cited

U.S. PATENT DOCUMENTS

| | | | |
|---|---|---|---|
| 9,654,645 B1* | 5/2017 | Kamat | H04M 7/1285 |
| 2012/0112908 A1* | 5/2012 | Prykari | H04L 67/55 |
| | | | 340/540 |
| 2017/0193982 A1* | 7/2017 | Agrawal | G10L 13/04 |
| 2018/0278740 A1* | 9/2018 | Choi | G06F 3/04847 |
| 2021/0335342 A1* | 10/2021 | Yuan | G06N 20/00 |

\* cited by examiner

*Primary Examiner* — Michael N Opsasnick
(74) *Attorney, Agent, or Firm* — PIERCE ATWOOD LLP

(57) ABSTRACT

Techniques for ordering the output of notification summaries are described. A system may receive multiple notifications intended for a same user or group of users. In response to receiving a user input requesting output of notifications (or in response to multiple notifications expiring soon), the system may identify multiple notifications intended for the user or group of users. The system generates natural language summaries of the notifications, and orders the natural language summaries based on one or more default ordering rules, one or more user preferences, one or more notification provider preference, and/or user feedback. The system then outputs the ordered natural language summaries to the user.

20 Claims, 12 Drawing Sheets

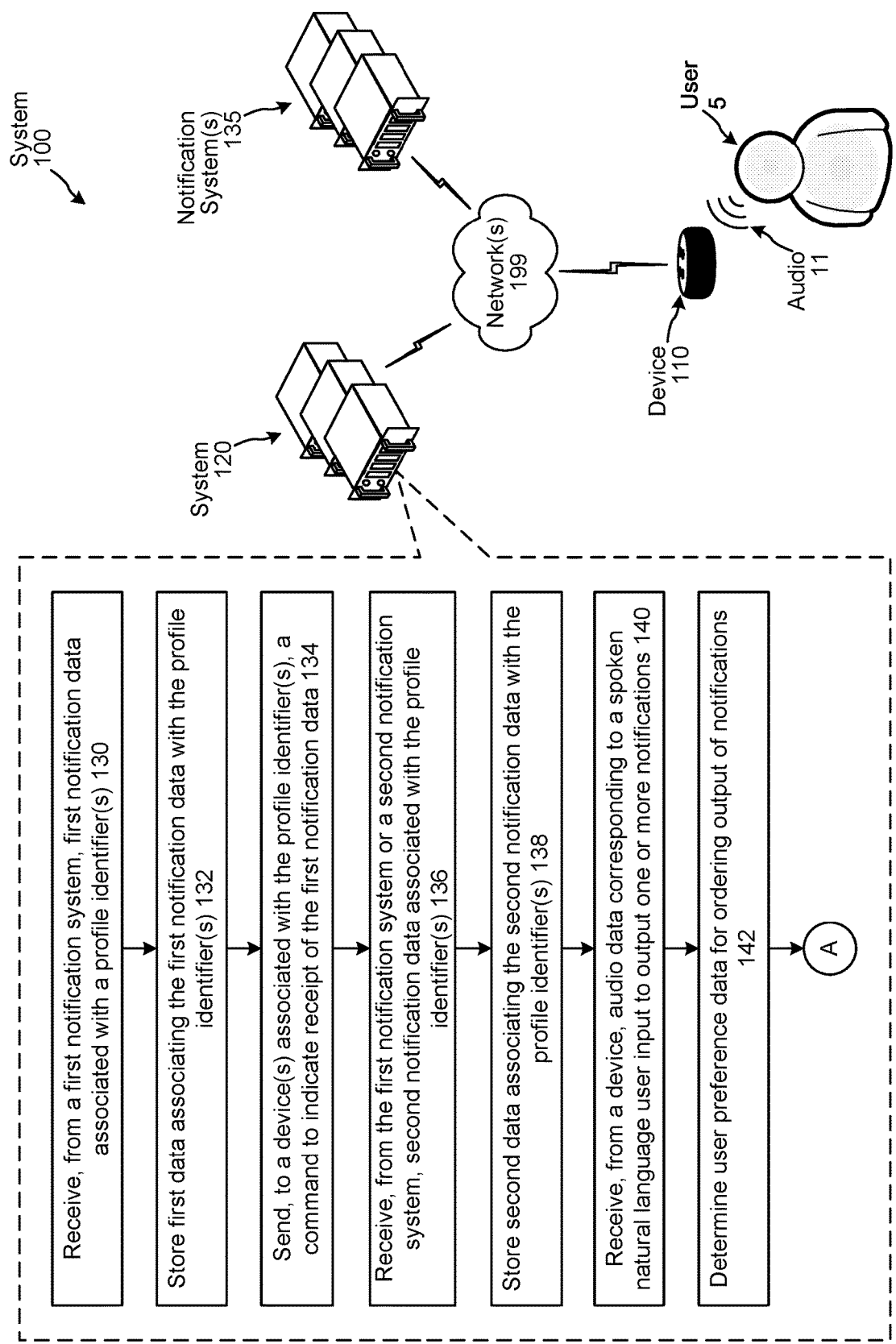

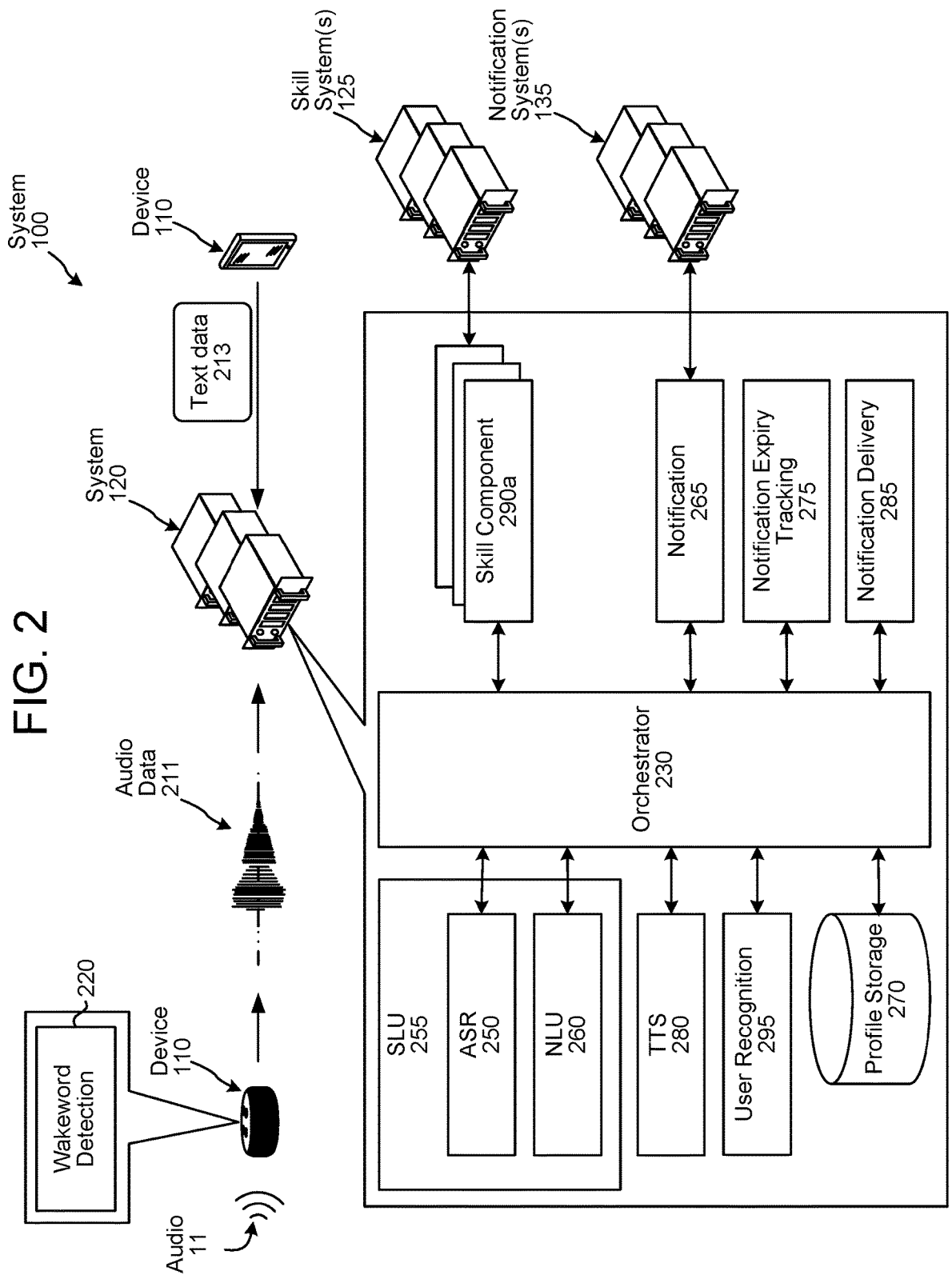

VOICE USER INTERFACE NOTIFICATION ORDERING

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating a system configured to order a plurality of notifications for output to a user, according to embodiments of the present disclosure.

FIG. 2 is a conceptual diagram of components of a system, according to embodiments of the present disclosure.

DETAILED DESCRIPTION

Figure 1B:
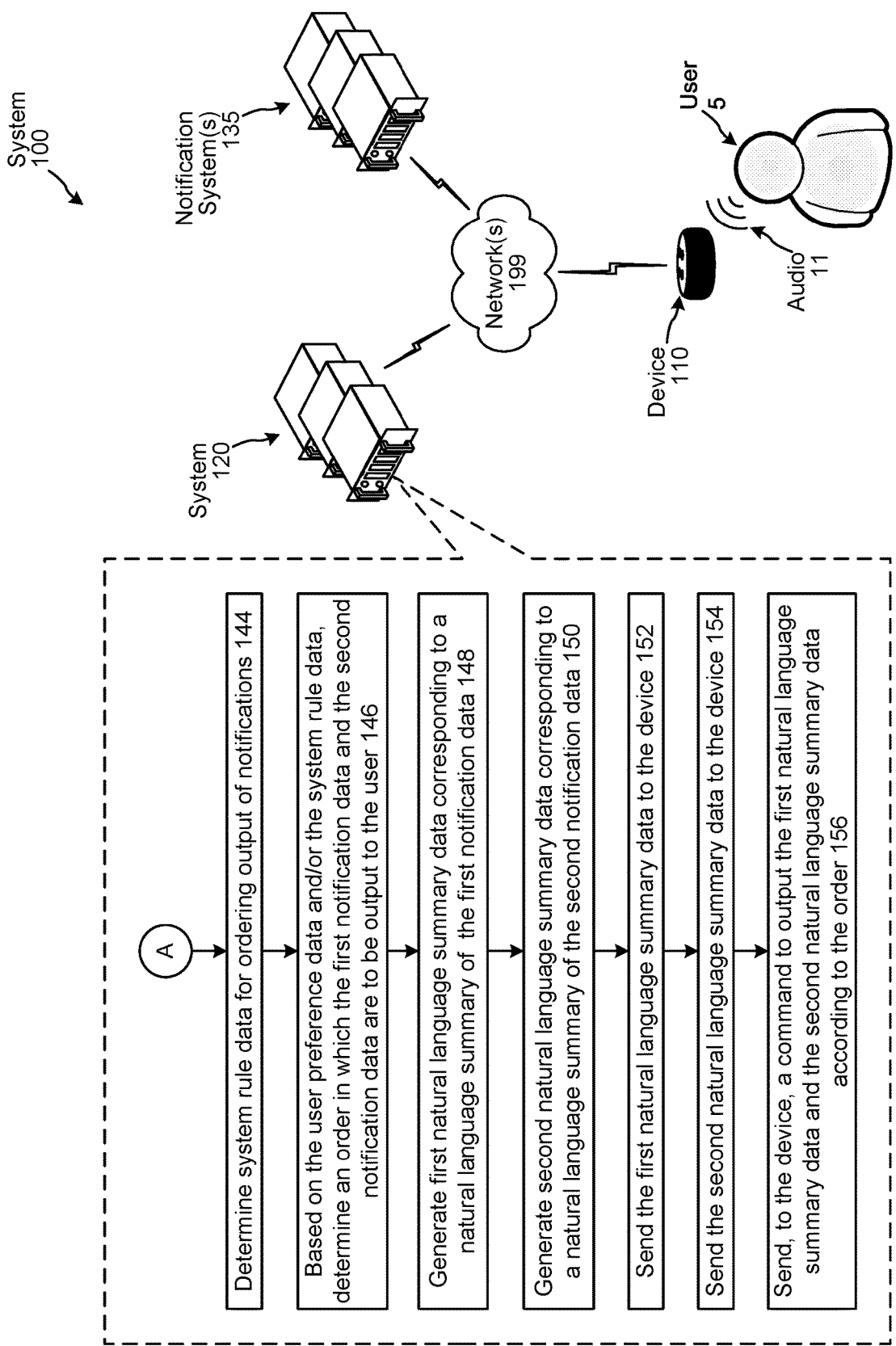

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

A user (and/or group of users, such as a household of users) may subscribe to receive notifications from one or more notification systems when particular events occur. As used herein, a "notification" may refer to data, output from a notification system when an event occurs, that is intended to cause a device to present some indicator to a user of the presence of notification content. A system, however, may not output notification content to the intended user until the user explicitly requests the notification content be output. Example types of notifications include "order ready" notifications, delivery notifications, calendar event notifications, sporting event notifications, taxi arrival notifications, and the like.

A system may receive a notification from a notification system and, in response thereto, the system may cause a device (of the user and/or group of users) to output an indication representing the user and/or group of users has at least one notification to be output. For example, the system may cause a device (e.g., not including or otherwise being associated with a display) to activate a visual indicator (e.g., a light ring or other type of light) in a particular manner (e.g., flashing yellow) to indicate to the user and/or group of users that there is at least one notification to be output. For further example, the system may cause a device (e.g., a smart phone, tablet, smart television, or other device including or otherwise associated with a display) to display text, an image, a banner, an icon, or the like indicating to the user and/or group of users that there is at least one notification to be output. For further example, the system may cause a device (e.g., a smart watch, a smart ring on a user's finger, smart glasses, a smart phone, tablet, or other mobile device) to vibrate in a particular manner (e.g., at a particular vibration strength, a particular vibration pattern, etc.) to indicate to the user and/or group of users that there is at least one notification to be output.

Thereafter, in response to receiving a voice user interface (VUI) user input to output the at least one notification, the system may send audio data (corresponding to TTS-generated synthesized speech) and/or text data corresponding to the notification to the device for output. Example VUI user inputs that may trigger the foregoing system outputs include, "Alexa, what are my notifications," "Alexa, output my notifications," and the like, where "Alexa" is a wakeword to transition the user's device out of a sleep/low power state, and the remaining portions of the VUI user inputs correspond to commands to output the user's notifications.

In at least some instances, one or more notification systems may provide a plurality of notifications (intended for a particular user and/or group of users) since a last time the user and/or group of users requested notifications be output. The present disclosure provides, among other things, techniques for ordering a plurality of notifications for output to the user (e.g., via a VUI). For example, in response to the system receiving a VUI user input to output one or more notifications, the system may determine a plurality of notifications intended to be output to the user, and may order the plurality of notifications based on one or more user-defined ordering preferences, device information, and/or other information.

In at least some embodiments, the system may generate a digest summarizing the ordered plurality of notifications, and may output the digest to the user as synthesized speech. For example, the system may receive and store (for a user and/or group of users) a product delivery notification from a first notification system, and a taxi arrival notification from a second notification system. Based on one or more user-defined ordering preferences, device information, and/or other information, the system may determine the taxi arrival notification is to be output prior to the product delivery notification. The system may generate a digest corresponding to the synthesized speech "you received a taxi arrival notification from [name associated with second notification system], and a product delivery notification from [name associated with first notification system], would you like to hear a particular notification." The system may then cause a device of the user to output the synthesized speech and, if the system thereafter receives a user input to output a particular notification of the digest, the system may generate and output synthesized speech corresponding to the particularly-requested notification.

Teachings of the present disclosure provide an improved user experience by outputting, to a user, a plurality of notifications in a succinct, easily digestible manner.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A-1B illustrate a system 100 configured to order a plurality of notifications for output to a user. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include a device 110 (local to a user 5), a system 120, and at least one notification system 135 in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system 120 receives (130), from a first notification system 135a, first notification data associated with (or including) a profile identifier. For example, the first notification data may be associated with (or include) a user profile identifier and/or a group profile identifier. The first notification data may correspond to, for example, a product delivery notification (e.g., representing an anticipated product delivery time) output by a shopping notification system, a calendar event notification (e.g., representing an upcoming start time of a calendar event) output by a calendar notification system, a television show notification (e.g., representing an upcoming start time of a television show) output by a television show notification system, a taxi arrival notification (e.g., representing an anticipated arrival of a taxi) output by a taxi notification system, or a weather notification (e.g., representing upcoming weather information) output by a weather notification system. In at least some embodiments, the first notification data may be in a structured, tagged, non-natural language format.

The system 120 stores (132) first data associating the first notification data with the profile identifier(s) associated with (or included in) the first notification data. In at least some embodiments, when the first notification data is associated with (or includes) a group profile identifier, the system 120 may store the first data to associate the first notification data with each user profile identifier associated with the group profile identifier.

In response to receiving the first notification data (and optionally in response to storing the first data), the system 120 determines a device(s) 110 associated with the profile identifier(s), and sends (134), to the device(s) 110, a command to indicate the system 120 received the first notification data. For example, the system 120 may determine the profile identifier(s) is associated with a first device identifier corresponding to a first device 110a, and based thereon send the command to the first device 110a. In at least some embodiments, the system 120 may determine the profile identifier(s) is associated with a plurality of device identifiers, each corresponding to a different device 110. In such embodiments, the system 120 may send the command to a portion of or all of the plurality of devices 110.

The command causes the device(s) 110 to generally indicate the system 120 received the first notification data, without providing any specific content of the first notification data. The command may cause the device(s) 110 to visually indicate the system 120 received the first notification data. In at least some embodiments, a device 110 may be a device not including or otherwise being associated with a display. In such embodiments, the device 110 may indicate the system 120 received the first notification data by activating a light (e.g., a light ring or other type of light) in a particular manner (e.g., flashing yellow). The command may additionally or alternatively cause the device 110 to indicate, in a particular haptic manner, that the system 120 received the first notification data.

After sending the command to the device(s) 110), but prior to receiving a user input to output one or more notifications, the system 120 receives (136), from the first notification system 135a or a second notification system 135b, second notification data associated with (or including) the profile identifier(s). The second notification data may correspond to, for example, a product delivery notification (e.g., representing an anticipated product delivery time) output by a shopping notification system, a calendar event notification (e.g., representing an upcoming start time of a calendar event) output by a calendar notification system, a television show notification (e.g., representing an upcoming start time of a television show) output by a television show notification system, a taxi arrival notification (e.g., representing an anticipated arrival of a taxi) output by a taxi notification system, or a weather notification (e.g., representing upcoming weather information) output by a weather notification system. In at least some embodiments, the second notification data may be in a structured, tagged, non-natural language format.

The system 120 stores (138) second data associating the second notification data with the profile identifier(s) associated with (or included in) the second notification data. In at least some embodiments, when the second notification data is associated with (or includes) a group profile identifier, the system 120 may store the second data to associate the second notification data with each user profile identifier associated with the group profile identifier.

After the system 120 receives the second notification data (and optionally after the system 120 stores the second data), the device 110 may receive audio corresponding to a spoken natural language user input from the user 5. The device 110 may determine audio data representing the audio, and may send the audio data to the system 120, which the system 120 receives (140). For example, the system 120 may perform ASR processing on the audio data to determine ASR output data, and may perform NLU processing on the ASR output data to determine NLU output data representing the spoken natural language user input requests output of one or more notifications. Alternatively, the system 120 may perform SLU processing on the audio data to determine NLU output data representing the spoken natural language user input requests output of one or more notifications. An example of such a spoken natural language user input is "Alexa, what are my notifications," with "Alexa" being a wakeword and "what are my notifications" corresponding to a command to output one or more notifications intended for the user 5.

While the foregoing describes the device 110 receives a spoken natural language input, it will be appreciated that the present disclosure is not limited thereto. For example, the device 110 may detect (or receive sensor data representing) the user 5 has entered a room. Such detection may be based on a motion sensor detecting movement, the device 110 detecting speech, the device 110 (or another device) detecting a Bluetooth (or other signal) output from a smart phone, smart watch, etc. of the user, etc. When it is determined that the user 5 has entered the room, the device 110 may send data, indicating such, to the system 120.

After determining the spoken natural language user input requests output of one or more notifications (or after receiving data representing a user has entered a room in which the device 110 is located), the system 120 may determine (142) user preference data for ordering output of notifications. The user preference data may represent one or more user preferences for ordering output of notifications. For example, a user preference may indicate a first notification type is to be output before a second notification type. Example notification types include, but are not limited to, order alert notifications, delivery notifications, calendar event notifications, taxi arrival notifications, sporting event notifications, news notifications, weather notifications, and television content notifications. In at least some embodiments, the system 120 may determine a user profile identifier associated with the spoken natural language user input (e.g., as output from user recognition processing), and may determine user preference data associated with the user profile identifier.

Additionally or alternatively, and after determining the spoken natural language user input request output of one or more notifications, the system 120 may determine (144) system rule data for ordering output of notifications. The system rule data may represent one or more system-configured rules for ordering output of notifications.

For example, a system-configured rule may indicate a notification (corresponding to a life critical notification type) is to be output prior to any other notification type. A life critical notification type may refer to notifications such as severe weather notifications, Amber alert notifications, crime notifications, and the like.

For further example, a system-configured rule may indicate a notification, provided by a trusted notification system, is to be output prior to a notification received from an untrusted notification system. A notification system may be trusted if a rating (or other score), associated with the notification system, satisfies a condition (e.g., meets or exceeds a threshold rating/score). Conversely, a notification system may be untrusted if a rating (or other score), associated with the notification system, fails to satisfy a condition (e.g., fails to meet or exceed the threshold rating/score).

In another example, a system-configured rule may indicate a multi-turn notification is to be output after a single-turn notification. A multi-turn notification refers to a notification that requires multiple user inputs and corresponding system outputs in order for an entirety of the notification to be output. Conversely, a non-multi-turn notification refers to a notification that is output, in its entirety, in response to a single user input requesting output of the particular notification.

In yet another example, a system-configured rule may indicate a notification, associated with an output duration meeting or exceeding a threshold duration of time, is to be output after a notification associated with an output duration failing to meet or exceed the threshold duration of time. It will be appreciated that the foregoing system-configured rules are illustrative, and that the system 120 may implement one or more different or additional system-configured rules without departing from the present disclosure.

Based on the user preference data and/or the system rule data, the system 120 determines (146) an order in which the first notification data and the second notification data are to be output to the user. Such processing of the system 120 is described in detail with respect to FIG. 5 herein.

The system 120 generates (148) first natural language summary data corresponding to a natural language summary of the first notification data. For example, the first natural language summary data may include natural language representing a notification type of the first notification (in the first notification data), as well as a name of the first notification system 135*a* that sent the first notification data to the system 120. For example, the first natural language data may correspond to "you received a taxi arrival notification from Bob's."

In at least some embodiments, the system 120 may generate the first natural language summary data using template data. In at least some other embodiments, the system 120 may generate the first natural language summary data using one or more art known/industry known techniques.

The first natural language summary data may include first natural language text data. Additionally or alternatively, the first natural language summary data may include first TTS-generated audio data including first natural language synthesized speech.

The system 120 also generates (150) second natural language summary data corresponding to a natural language summary of the second notification data. As with the first natural language summary data, the system 120 may generate the second natural language summary data using template data and/or one or more art known/industry known natural language generation techniques. The second natural language summary data may include second natural language text data. Additionally or alternatively, the second natural language summary data may include second TTS-generated audio data including second natural language synthesized speech.

After generating the first natural language summary data, the system 120 may send (152) the first natural language summary data to the device 110. Likewise, after generating the second natural language summary data, the system 120 may send (154) the second natural language summary data to the device 110. In at least some embodiments, the system 120 may send the first natural language summary data before sending the second natural language summary data. In at least some embodiments, the system 120 may send the second natural language summary data before sending the first natural language summary data. In at least some embodiments, the system 120 may send the first natural language summary data and the second natural language summary data in a same data transmission.

The system 120 also sends (156), to the device 110, a command to output the first natural language summary data and the second natural language summary data according to the order determined at step 146. For example, if the command indicates the first natural language summary data is to be output to the user 5 prior to the second natural language summary data, the device 110 may output first audio (corresponding to the first natural language synthesized speech) and/or display first text (corresponding to the first natural language text data), and thereafter output second audio (corresponding to the second natural language synthesized speech) and/or display second text (corresponding to the second natural language text data).

In at least some embodiments, the system 120 may send the command to the device 110 in a same data transmission as the first natural language summary data and/or the second natural language summary data.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language user input. The device 110 may determine text data 213 representing the typed natural language user input, and may send the text data 213 to the system 120, wherein the text data 213 is received by the orchestrator component 230.

The orchestrator component 230 may send the text data 213 or ASR output data output, depending on the type of natural language user input received, to a NLU component 260. The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a<Mute>intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic>intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a<PlayMusic>intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a<PlayMusic>intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 125 via one or more skill components 290. As used herein, a "skill" may refer to a skill component 290, a skill system 125, or a combination of a skill component 290 and a skill system 125. A skill may be configured to execute with respect to NLU output data. For example, for an NLU hypothesis including a<GetWeather>intent, the system 120 (and more particularly the orchestrator component 230) may invoke a weather skill to determine and output weather information for a geographic location represented in a user profile or corresponding to a location of the device 110 that captured the corresponding natural language user input. For further example, for an NLU hypothesis including a<BookRide>intent, the system 120 (and more particularly the orchestrator component 230) may invoke a taxi skill to book a requested ride. In another example, for an NLU hypothesis including a<BuyPizza>intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include)

one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 4:
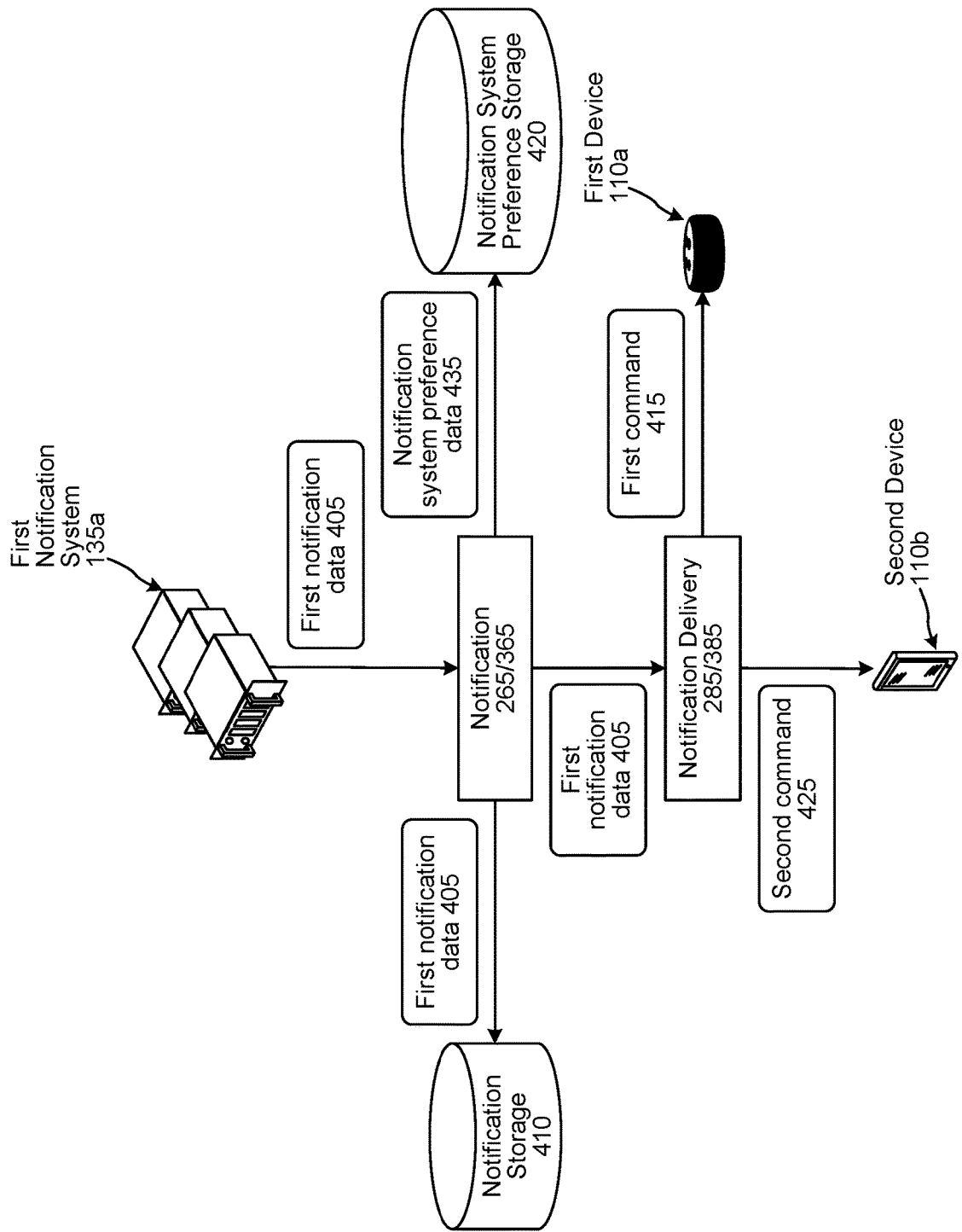
FIG. 4 is a conceptual diagram of components for indicating when notification data for a user and/or group of users has been received, according to embodiments of the present disclosure.
Figure 5:
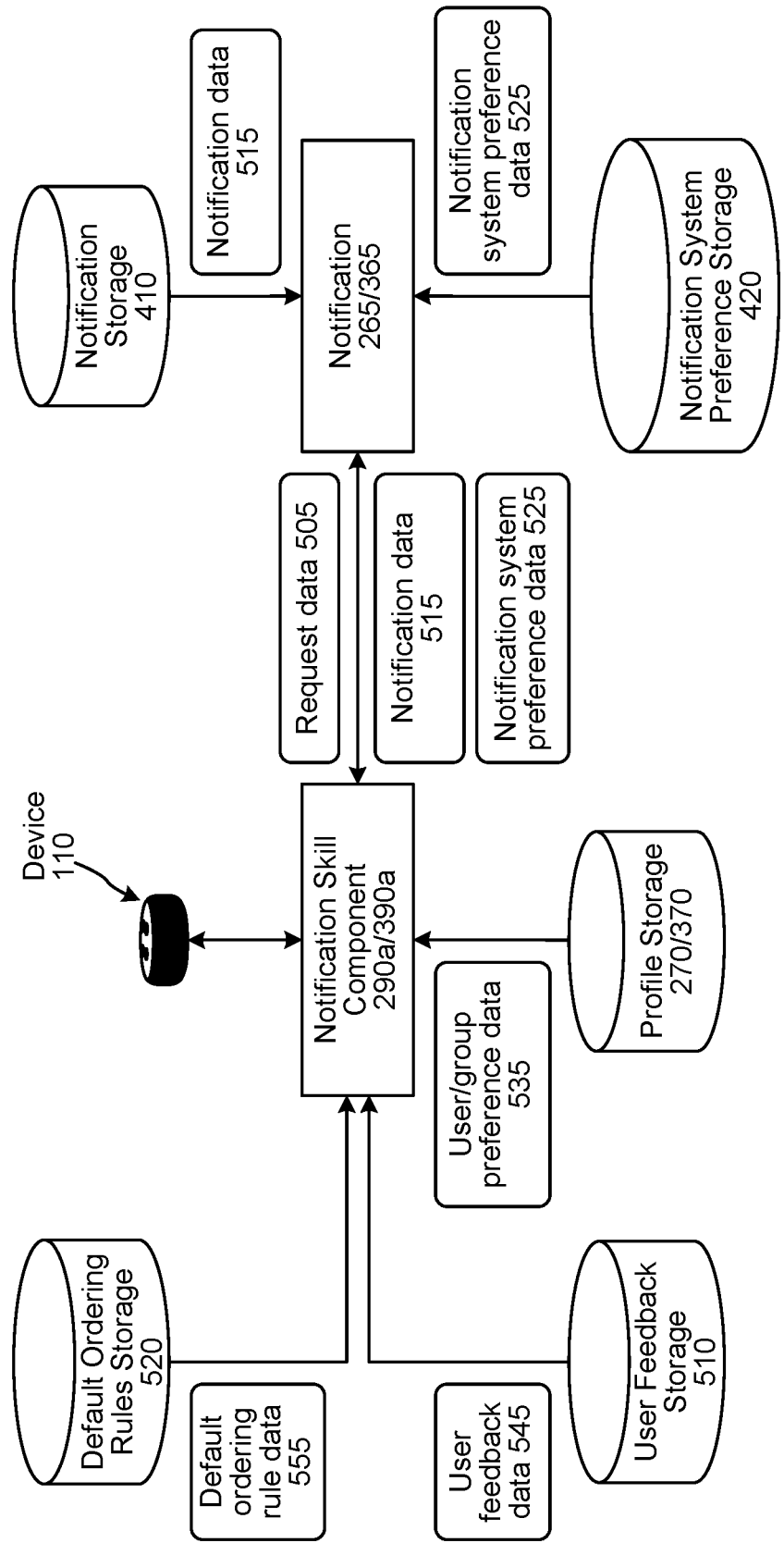
FIG. 5 is a conceptual diagram of components for ordering the output of a plurality of notifications, according to embodiments of the present disclosure.
Figure 6:
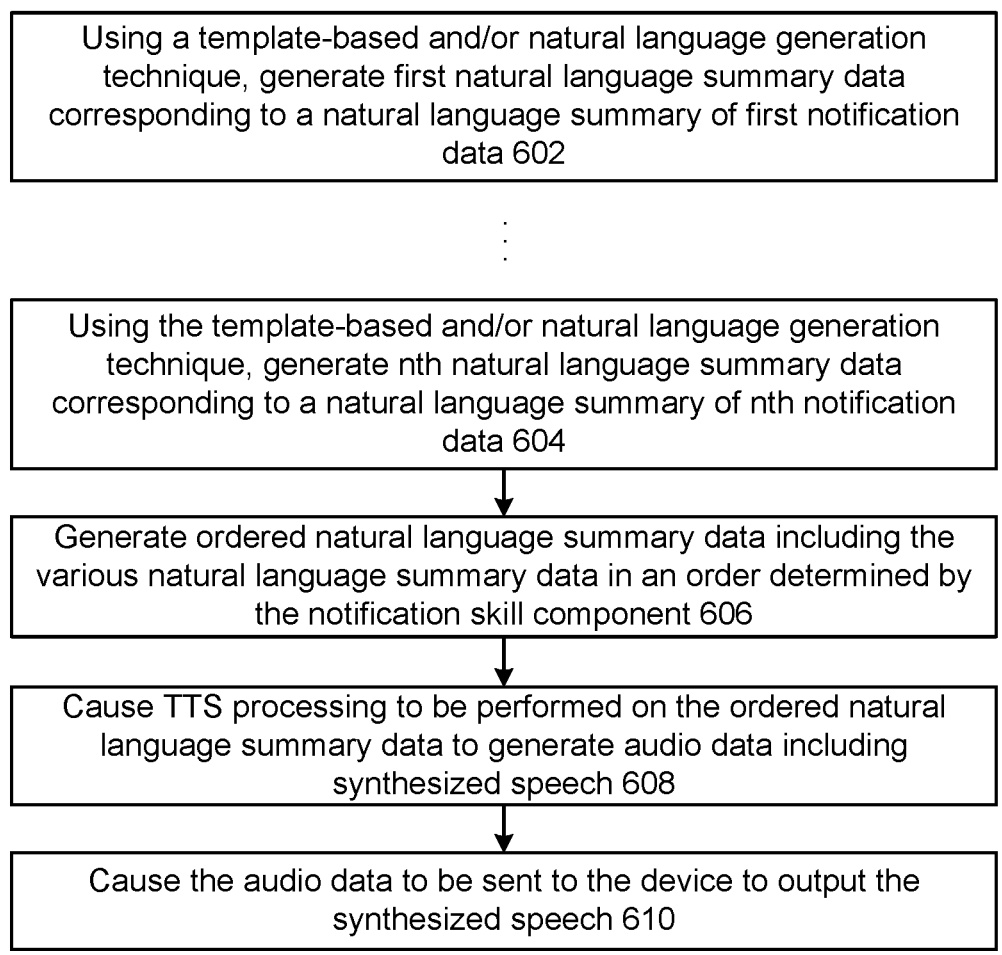
FIG. 6 is a process flow diagram illustrating how a digest, summarizing a plurality of notifications, may be generated and output, according to embodiments of the present disclosure.

The system 120 may include a notification component 265, a notification expiry tracking component 275, and a notification delivery component 285 configured to process as described in detail with respect to FIGS. 4-6.

Figure 3:
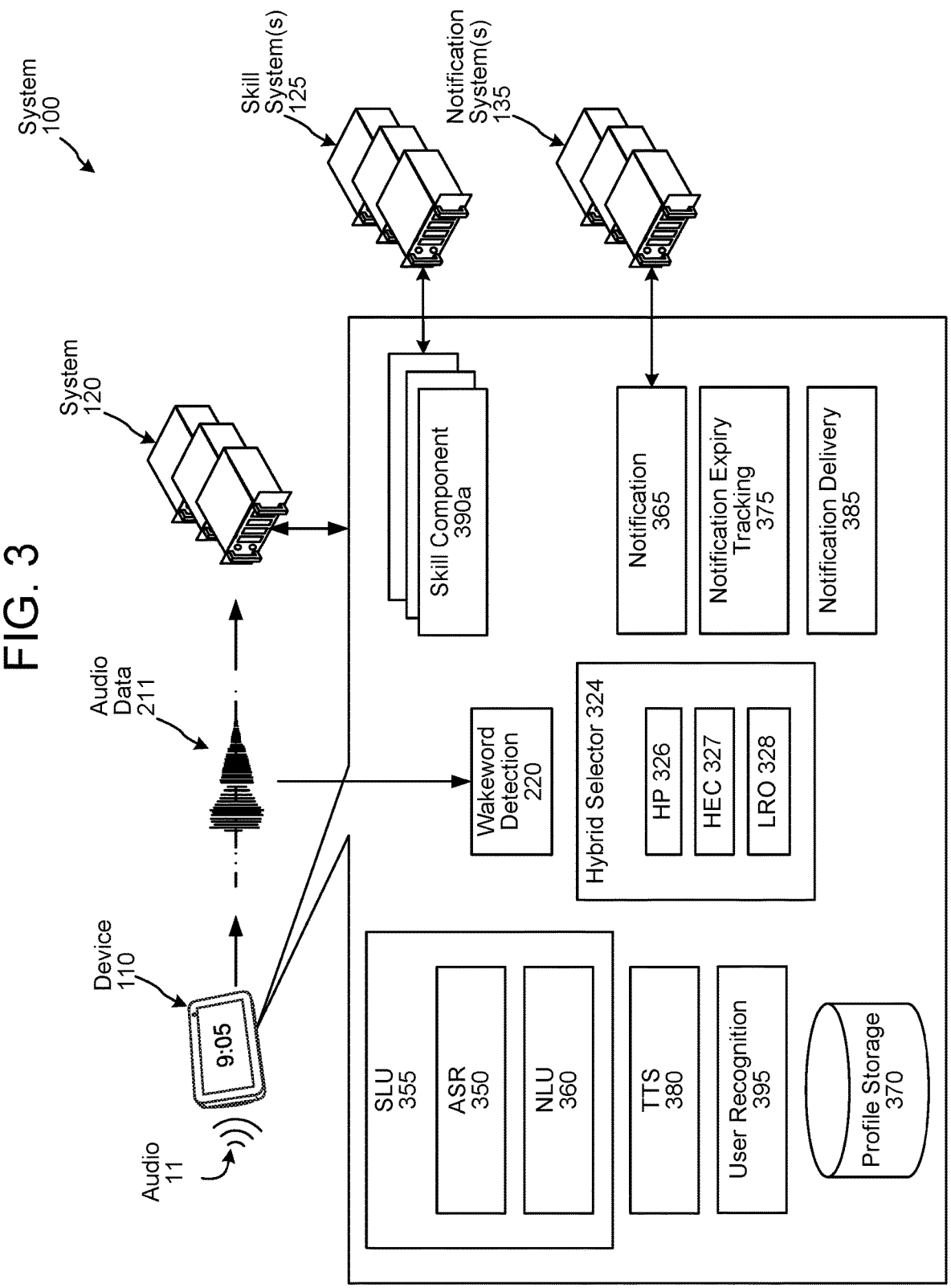
FIG. 3 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU component 355 (an ASR component 350 and an NLU 360), similar to the manner discussed above with respect to the SLU component 255 (or ASR component 250 and the NLU component 260) of the system 120. The device 110 may also internally include, or otherwise have access to, other components such as one or more skill components 390 capable of executing commands based on NLU output data or other results determined by the device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 125. The device 110 may include a notification component 365, a notification expiry tracking component 375, and a notification delivery component 385 configured to process as described in detail with respect to FIGS. 4-6.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a skill system 125.

Referring now to FIG. 4, it is described how the system 120/a device(s) 110 may indicate to a user and/or group of users when notification data has been received for the user and/or group of users from a notification system 135. A first notification system 135a may send first notification data 405 to the notification component 265/365. In at least some embodiments, the first notification system 135a may be implemented as a skill system 125. In at least some embodiments, the first notification system 135a may be implemented as a skill component 290/390. In at least some embodiments, the first notification system 135a may be implemented as a software application. The first notification system 135a may send the first notification data 405 when an event occurs that the first notification system 135a may be configured to track (e.g., the upcoming start of a sporting event, the upcoming start of a television show, the upcoming anticipated arrival of a taxi, etc.).

The first notification data 405 may include information (e.g., one or more facts) corresponding to a particular topic (e.g., domain), such as electronic calendar, email, sports, weather, taxi, shopping, television, etc. The first notification data 405 may include a first notification in a structured, tagged, non-natural language format. In other words, the first notification (as represented in the first notification data 405) may not be in a format that the first notification would take when being output to an intended user and/or group of users. For example, the first notification data 405 may include a first notification corresponding to "EventTitle: Meeting with John; Time: 15 minutes," representing a meeting with John is starting in 15 minutes. For further example, the first notification data 405 may include a first notification corresponding to "SenderName: Jane; Time: 2 minutes," representing an email was received from Jane 2 minutes ago. In another example, the first notification data 405 may include a first notification corresponding to "SportsTeamName: Seahawks; Time: 30 minutes," representing a Seahawks game is starting in 30 minutes. For further example, the first notification data 405 may include a first notification corresponding to "WeatherType: Rain; Time: 45 minutes," representing it will start raining in about 45 minutes. In another example, the first notification data 405 may include a first notification corresponding to "TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the first notification data 405 may include a first notification corresponding to "ProductName: Dish soap; DeliveryTime: 45 minutes," representing ordered dish soap is expected to be delivered in about 45 minutes. In another example, the first notification data 405 may include a first notification corresponding to "TelevisionShow: News: Time: 10 minutes," representing the news will begin being televised in 10 minutes.

In addition to including information to be output to an intended user and/or group of users, the first notification data 405 may include a user profile identifier and/or group profile identifier corresponding to an intended user and/or group of users to receive the first notification, respectively. In at least some embodiments, the first notification data 405 may include a user profile identifier and/or group profile identifier stored in the profile storage 270/370. In at least some other embodiments, the first notification data 405 may include an encoded user profile identifier corresponding to a user profile identifier stored in the profile storage 270/370. In at least some other embodiments, the first notification data 405 may include an encoded group profile identifier corresponding to a group profile identifier stored in the profile storage 270/370. In at least some embodiments, to maintain user privacy, the first notification system 135a may not have access to a user profile identifier and/or group profile identifier stored in the profile storage 270/370. In these embodiments, the first notification data 405 may include an identifier that uniquely corresponds to a particular user profile identifier and/or group profile identifier stored in the profile storage 270/370.

Upon receiving the first notification data 405 from the first notification system 135a, the notification component 265/365 stores the first notification data 405 in a notification storage 410. The notification storage 410 may be implemented by the system 120 or a device 110. The notification storage 410 may store notification data corresponding to various notifications received from at least one notification system 135 and intended for various users of the system 100. For example, the first notification data 405 may be represented in the notification storage 410 as an entry including the structured, tagged, non-natural language first notification associated with the user profile identifier and/or group profile identifier. In instances where the first notification data 405 includes an encoded user profile identifier or an encoded group profile identifier, the notification component 265/365 may perform one or more art-known/industry-known decoding techniques on the encoded user profile identifier or encoded group profile identifier to determine the corresponding user profile identifier and/or group profile identifier, and thereafter cause the decoded user profile identifier and/or group profile identifier to be associated with the structured, tagged, non-natural language first notification in the notification storage 410. In instances where the first notification data 405 includes a unique identifier as described previously, the notification component 265/365 may use a table (including unique identifiers associated with respective user profile identifiers and/or group profile identifiers) to determine the unique identifier is associated with a particular user profile identifier and/or group profile identifier, and thereafter cause the particular user profile identifier and/or group profile identifier to be associated with the structured, tagged, non-natural language first notification in the notification storage 410.

In at least some embodiments, rather than or in addition to storing the structured, tagged, non-natural language first notification in the notification storage 410, the notification component 265/365 may generate natural language data representing the structured, tagged, non, natural language first notification, and store the natural language data in the notification storage 410. The notification component 265/365 may use a template-based approach to generate the natural language data. A template may include natural language with portions (e.g., variables) to be populated with information from the structured, tagged, non-natural language first notification. A template may be associated with a notification system 135. A template may additionally or alternatively be associated with a notification type. For example, a calendar event notification template may include the natural language "your calendar entry titled [event title] is starting in [time information]," with [event title] and [time information] corresponding to portions to be populated. For further example, an email notification template may include the natural language "you received an email from [sender name] [time information] ago," with [sender name] and [time information] corresponding to portions to be populated. In another example, a sporting event notification template may include the natural language "the [team name] game is starting in [time information]," with [team name] and [time information] corresponding to portions to be populated. For further example, a weather notification template may include the natural language "it will be [weather type] at your location in about [time information]," with [weather type] and [time information] corresponding to portions to be populated. In another example, a taxi arrival notification template may include the natural language "your ride from [taxi service name] is expected to arrive in [time information], be on the lookout for a [vehicle information] having license plate number [license plate number] at [pickup location]," with [taxi service name], [time information], [vehicle information], [license plate number], and [pickup location] corresponding to portions to be populated. For further example, a product delivery notification template may include the natural language "your [product name] will be delivered in [time information]," with [product name] and [time information] corresponding to portions to be populated. In another example, a television show notification template may include the natural language "[television show title] is starting in [time information]," with [televisions show title] and [time information] corresponding to portions to be populated.

The notification component 265/365 may determine a notification type corresponding to the first notification data 405. Thereafter, the notification component 265/365 may determine template data corresponding to a notification template associated with the notification type of the first notification data 405 and/or the first notification system 135a that provided the first notification data 405.

The notification component 265/365 may generate the natural language data (corresponding to a natural language representation of the structured, tagged, non-natural language first notification) using the template data and the first notification data 405. For example, the structured, tagged, non-natural language first notification may correspond to "EventTitle: Meeting with John; Time: 15 minutes," and the template data may correspond to the natural language "your calendar entry titled [event title] is starting in [time information]." In this example, the natural language data may be "your calendar entry titled meeting with John is starting in 15 minutes." For further example, the structured, tagged, non-natural language first notification may correspond to "SenderName: Jane; Time: 2 minutes," and the template data may correspond to the natural language "you received an email from [sender name] [time information] ago.". In this example, the natural language data may be "you received an email from Jane 2 minutes ago." In another example, the structured, tagged, non-natural language first notification may correspond to "SportsTeamName: Seahawks; Time: 30 minutes," and the template data may correspond to the natural language "the [team name] game is starting in [time information]." In this example, the natural language data may be "the Seahawks game is starting in 30 minutes."

Alternatively, the notification component 265/365 may perform one or more art-known/industry-known natural language generation processing techniques using the structured, tagged, non-natural language first notification to generate the natural language data.

In at least some embodiments, the notification component 265/365 may confirm the intended user and/or group or users subscribed to receive the first notification prior to storing the first notification data 405 in the notification storage 410. For example, the notification component 265/365 may determine the user profile identifier and/or group profile identifier represented in the first notification data 405, corresponding to an encoded user profile identifier or encoded group profile identifier represented in the first notification data 405, or corresponding to a unique identifier represented in the first notification data 405. The notification component 265/365 may determine (in the profile storage 270/370) user profile data and/or group profile data corresponding to the user profile identifier and/or group profile identifier, respectively. The notification component 265/365 may determine whether the user profile data and/or group profile data represents the user and/or group of users has authorized the first notification system 135a to provide notifications. If the notification component 265/365 determines the user profile data and/or group profile data does not represent the user and/or group of users has provided the foregoing authorization, the notification component 265/365 may prevent the first notification data 405 from being stored in the notification storage 410, and may delete the first notification data 405. Conversely, if the notification component 265/365 determines the user profile data and/or group profile data represents the user and/or group of users has provided the foregoing authorization, the notification component 265/365 may store the first notification data 405 in the notification storage 410.

In at least some embodiments, the notification component 265/365 may determine whether the user profile data and/or group profile data represents the user and/or group of users has authorized the first notification system 135a to provide notifications corresponding to a specific notification type represented in the first notification data 405. Example notification types include, but are not limited to, new email notifications, upcoming television show notifications, taxi upcoming arrival notifications, product upcoming delivery notifications, and upcoming calendar event notifications. If the notification component 265/365 determines the user profile data and/or group profile data does not represent the user and/or group of users has provided the foregoing authorization, the notification component 265/365 may prevent the first notification data 405 from being stored in the notification storage 410, and may delete the first notification data 405. Conversely, if the notification component 265/365 determines the user profile data and/or group profile data represents the user and/or group of users has provided the foregoing authorization, the notification component 265/365 may store the first notification data 405 in the notification storage 410.

After receiving the first notification data 405 from the first notification system 135a (and optionally after storing the first notification data 405 in the notification storage 410), the notification component 265/365 sends the first notification data 405 to the notification delivery component 285/385. Generally, the notification delivery component 285/385 is configured to selectively indicate to the user and/or group of users that the user and/or group of users has received a notification, without providing the user and/or group of users with content of the received notification.

In at least some embodiments, a device 110 may output an indication (e.g., a flashing yellow light, displayed content, vibration of the device 110, etc.) that a user and/or group of users has received a notification from a time when the notification component 265/365 receives and stores notification data and until a corresponding natural language notification(s) is output to the user and/or group of users. Accordingly, there may be instances when a device(s) 110 of the user and/or group of users is outputting an indication of a previously received notification when the notification component 265/365 receives and stores the first notification data 405. Thus, after receiving the first notification data 405, the notification delivery component 285/385 may determine whether a device(s) 110 of the user and/or group of users is presently outputting an indication representing the user and/or group of users has received a notification(s).

As part of the foregoing determination, the notification delivery component 285/385 may determine a user profile identifier and/or group profile identifier represented in the first notification data 405. If the first notification data 405 includes an encoded user profile identifier or encoded group profile identifier corresponding to a user profile identifier stored in the profile storage 270/370, the notification delivery component 285/385 may perform one or more art-known/industry-known decoding techniques on the encoded user profile identifier or encoded group profile identifier to determine the corresponding user profile identifier and/or group profile identifier. If the first notification data 405 includes a unique identifier as described previously, the notification delivery component 285/385 may use a table (including unique identifiers associated with respective user profile identifiers and/or group profile identifiers) to determine the unique identifier is associated with a particular user profile identifier and/or group profile identifier. Alternatively, if the first notification data 405 includes an encoded user profile identifier, group profile identifier, or unique identifier, the notification component 265/365 may determine the corresponding user profile identifier and/or group profile identifier, and send same to the notification delivery component 285/385.

After receiving or determining the user profile identifier and/or group profile identifier, the notification delivery component 285/385 may determine one or more device identifiers (e.g., device serial numbers) associated with the user profile identifier and/or group profile identifier. In other words, the notification delivery component 285/385 determines one or more device identifiers corresponding to one or more devices 110 registered to a user and/or group of users corresponding to the user profile identifier and/or group profile identifier.

Thereafter, the notification delivery component 285/385 may determine whether at least one of the one or more device identifiers is associated with data (e.g., a flag or other indicator) representing a device(s) 110 is presently outputting an indication that the user and/or group of users has a notification(s). If the notification delivery component 285/385 determines a device(s) 110 is presently outputting an indication, the notification delivery component 285/385 may cease processing with respect to the first notification data 405. Conversely, if the notification delivery component 285/385 determines no devices 110 of the user and/or group of users are presently outputting an indication, the notification delivery component 285/385 may determine how the first notification is to be indicated to the user and/or group of users.

The notification delivery component 285/385 may determine how to indicate the first notification based on device characteristics. The notification delivery component 285/385 may be configured to cause a device 110 to indicate notifications by activating a light(s) of the device 110 in a particular manner, by causing the device 110 to vibrate in a particular manner, and/or by displaying content on a display of or otherwise associated with the device 110. The notification delivery component 285/385 may determine one or more device identifiers associated with the user profile identifier and/or group profile identifier received or determined by the notification delivery component 285/385. Thereafter, the notification delivery component 285/385 may query the profile storage 270/370 for device characteristic data represented in device profile data associated with a device identifier in the profile storage 270/370. The device characteristic data may represent, for example whether the device 110 (corresponding to the device characteristic data) has a light(s) capable of indicating a user and/or group of users has a notification(s) and/or whether the device 110 includes or is otherwise in communication with a display capable of displaying content indicating a user and/or group of users has a notification(s).

The notification delivery component 285/385 may indicate the first notification to the user and/or group of users based on the device characteristic data. For example, if the notification delivery component 285/385 receives first device characteristic data representing a first device 110*a* includes a light(s), the notification delivery component 285/385 may send, to the first device 110*a*, a first command 415 to activate the light(s) in a manner that indicates the user and/or group of users has received a notification(s). In some situations, two or more devices of the user and/or group of users may be capable of indicating the first notification using lights of the two or more devices. In such situations, the notification delivery component 285/385 may send, to each of the two or more devices, a command to cause the respective device's light(s) to indicate the user and/or group of users has received a notification(s).

The notification delivery component 285/385 may additionally or alternatively receive second device characteristic data representing a second device 110*b* includes or is otherwise in communication with a display. In response to receiving the second device characteristic data, the notification delivery component 285/385 may send, to the second device 110*b*, a second command 425 to display text, an image, a popup graphical element (e.g., a banner) that indicates the user and/or group of users has received a notification(s). For example, the displayed text may correspond to "you have an unread notification." But the text may not include specifics of the first notification. An example of the second command 425 may be a mobile push command.

In some situations, two or more devices of the user and/or group of users may be capable of indicating the first notification by displaying content. In such situations, the notification delivery component 285/385 may send, to each of the two or more devices, a command to cause the respective device to display content indicating the user and/or group of users has received a notification(s).

The notification delivery component 285/385 may additionally or alternatively receive device characteristic data representing a device 110 includes a haptic component. In response to receiving the device characteristic data, the notification delivery component 285/385 may send, to the device 110, a command to vibrate in a manner (e.g., at a particular rate and/or at a particular strength, etc.) that indicates the user and/or group of users has received a notification(s).

The notification delivery component 285/385 may determine how to indicate the first notification based on user profile data and/or group profile data corresponding to the user profile identifier and/or group profile identifier received or determined by the notification delivery component 285/385. For example, the notification delivery component 285/385 may query the profile storage 270/370 for one or more indication preferences associated with the user profile identifier and/or group profile identifier in the profile storage 270/370. An indication preference may indicate whether notifications, received from a notification system 135, are to be indicated using a light of a device 110 and/or displayed content. An indication preference may alternatively indicate whether notifications, corresponding to a particular topic/domain, are to be indicated using a light of a device 110 and/or displayed content. An indication preference may alternatively indicate whether notifications, received from a notification system 135 and corresponding to a topic/domain, are to be indicated using a light of a device 110 and/or displayed content.

The notification delivery component 285/385 may additionally or alternatively determine how to indicate the first notification based on a preference of the first notification system 135*a* that provided the first notification data. For example, during offline operations, the first notification system 135*a* may indicate notifications provided by the first notification system 135*a* are to be indicated using a light of a device 110 and/or displayed content. For further example, during offline operations, the first notification system 135*a* may indicate notifications, corresponding to a particular type/domain and being provided by the first notification system 135*a*, are to be indicated using a light of a device 110 and/or displayed content. In another example, the first notification system 135*a* may indicate, at runtime, how the first notification is to be indicated. For example, the first notification data 405 may include a portion representing how the first notification is to be indicated to the user and/or group of users. For example, the first notification data 405 may include a portion representing the first notification is to be indicated using a light of a device 110 and/or displayed content.

In some situations, the notification delivery component 285/385 may determine a user preference(s) and a notification system preference(s) for indicating the first notification to the user and/or group of users. The notification delivery component 285/385 may give priority to the user preference(s) in situations where the user preference(s) does not conform with the notification system preference(s) (e.g., the user preference(s) indicates the first notification is to be indicated using a light(s), but the notification system preference(s) indicates the first notification is to be indicated using displayed content, or vice versa).

In some situations, the notification delivery component 285/385 may determine no device 110 of the user and/or group of users is capable of indicating the first notification as preferred by either a user preference(s) or a notification system preference(s). In such situations, the notification delivery component 285/385 may cause the device(s) 110 of the user and/or group of users to indicate the first notification according to characteristics of the device(s) 110.

If the notification delivery component 385 is implemented on device, the notification delivery component 385 may send a command to a component implemented by the same device 110. The notification delivery component 385 may also send a command to a different device 110 (associated with the same user profile identifier and/or group profile identifier as the device 110 implementing the notification delivery component 385) using one or more wireless data transmissions (e.g., via a network(s) 199, using Bluetooth, etc.).

The first notification data 405 may also include one or more preferences (of the first notification system 135*a*) for outputting the first notification. A notification system preference may represent an expiration of the first notification. For example, a notification system preference may indicate the first notification is to be output within a certain amount of time (e.g., immediately, within 1 hour, within 2 hours, etc.) of receipt of the first notification data 405 by the notification component 265/365.

A notification system preference may alternatively indicate an order in which the first notification is to be output. In at least some embodiments, one or more system ordering rules may prioritize output of one notification type over another notification type. The first notification system 135*a* may have access to the one or more system ordering rules, and may indicate an ordering preference for the first notification by strategically indicating (in the first notification data 405 or metadata associated therewith) that the first notification corresponds to a notification type that is prioritized in one or more of the system ordering rules.

The notification component 265/365 may determine notification system preference data 435 including a first notification identifier (uniquely corresponding to the first notification data 405) and the notification system preference(s) included in (or otherwise associated with) the first notification data 405. The notification component 265/365 may store the notification system preference data 435 in a notification system preference storage 420.

Alternatively, instead of the first notification system 135*a* including the notification system preference(s) in (or otherwise associated with) the first notification data 405 at runtime, the first notification system 135*a* may provide the notification system preference(s) during offline operations. For example, when the first notification system 135*a* registers with the system 100 to provide notifications to users of the system 100, the first notification system 135*a* may indicate one or more preferences for outputting notifications received from the first notification system 135*a*. In at least some embodiments, an offline-provided notification system preference may be specific to a particular notification type. Illustrative notification types include, but are not limited to, weather information notifications, television show reminder notifications, taxi anticipated arrival notifications, electronic calendar event notifications, and product delivery notifications. The system 120/device 110 may store data indicating, for the first notification system 135*a*, a notification type(s) and its respective notification system preference(s). At runtime, after receiving the first notification data 405, the notification component 265/365 may determine a first notification system identifier (of the first notification system 135*a*), determine a notification type(s) associated with the first notification system identifier in storage, determine a notification type of the first notification data 405, determine a notification system preference(s) associated with the first notification system identifier (and optionally the notification type) in storage, and generate the notification system preference data 435 to include the notification system preference(s) and a notification identifier uniquely corresponding to the first notification data 405.

It will be appreciated that the foregoing processing and storage with respect to the first notification data 405 may be performed with respect to second notification data, third notification data, etc. intended for a same user and/or group of users. Thus, the notification storage 410 and the notification system preference storage 420 may store multiple notification data for a given user and/or group of users at a single moment.

With reference to FIG. 5, sometime after the notification delivery component 285/385 causes at least one device 110 of the user and/or group of users to indicate the user and/or group of users have a notification(s), and while the notification storage 410 (and optionally the notification system preference storage 420) store multiple notification data for the intended user and/or group of users, a device 110 of the user and/or group of users may receive a user input to output the notification. For example, the device 110 may receive audio corresponding to a spoken natural language user input to output one or more notifications. An example of such a spoken natural language user input may be "Alexa, what are my notifications," "Alexa, output my notifications," and the like, where "Alexa" is a wakeword and the remaining portions of the spoken natural language user inputs correspond to commands to output the user's notifications. For further example, the device 110 may receive a text-based (e.g., typed) natural language user input to output one or more notifications. In another example, the device 110 may include or otherwise be associated with a camera that captures a sequence of images representing the user 5 performing a gesture (an example of a user input) to output one or more notifications. In a further example, the device 110 may include a button or display a virtual button (or other graphical user interface (GUI) element capable of being interacted with by the user 5), and the device 110 may detect the user 5 interacting with the button or other GUI element (an example of a user input) to output one or more notifications.

In at least some embodiments, the device 110 may send data, representing the user input, to the system 120 for processing. In some instances, the device 110 may be configured to communicate with (i.e., send data to and received data from) the system 120 via an application installed on the device 110 and associated with the system 120. Such an application may be referred to as a companion application. An example of such an application is the Amazon Alexa application that may be installed on a smart phone or tablet.

The device 110 or system 120 (depending on the components illustrated in FIGS. 2-3 being implemented) processes data representing the user input (e.g., audio data representing a spoken natural language user input, text data representing a text-based natural language user input, data representing a performed gesture, data representing a button interaction, etc.) to determine skill input data representing the user input requests one or more notifications be output, and including a user profile identifier and/or group profile identifier associated with the device 110 (that captured the user input) and/or user 5 (that provided the user input). In response, the device 110 or system 120 may send the skill input data to a notification skill component 290a/390a.

The notification skill component 290a/390a processes the skill input data to determine the skill input data represents one or more notifications are to be output, and includes the user profile identifier and/or group profile identifier. In response to such processing, the notification skill component 290a/390a generates request data 505 including the user profile identifier and/or group profile identifier, and requesting (i) notification data associated with the user profile identifier and/or group profile identifier, and (ii) notification system preference data associated with the notification data. The notification skill component 290a/390a sends the request data 505 to the notification component 265/365.

While the foregoing describes the notification skill component 290a/390a requesting the notification data and notification system preference data using the same request data (in other words using a single data transmission), the present disclosure is not limited thereto. In at least some embodiments, the notification skill component 290a/390a may send, to the notification component 265/365 first request data requesting the notification data and separate, second request data requesting the notification system preference data.

In response to receiving the request data 505, the notification component 265/365 queries the notification storage 410 for notification data associated with the user profile identifier and/or group profile identifier (represented in the request data 505). In response, the notification component 265/365 receives notification data 515 representing separate instances of notification data associated with the user profile identifier and/or group profile identifier in the notification storage 410. The notification data 515 represents a plurality of notifications received for the user profile identifier and/or group profile identifier from a time when the notification component 265/365 received the first notification data 405, and until the notification component 265/365 receives the request data 505. In other words, the notification data 515 may include, at a minimum, the first notification data 405 and second notification data, but may also include third notification data, fourth notification data, etc.

Additionally, in response to receiving the request data 505, the notification component 265/365 queries the notification system preference storage 420 for notification system preference data associated with the user profile identifier and/or group profile identifier (represented in the request data 505). Alternatively, the notification component 265/365 may query the notification system preference storage 420 for notification system preference data associated with the plurality of separate instances of notification data embodied in the notification data 515. In response, the notification component 265/365 may receive a null value in instances where the notification system preference storage 420 does not include any notification system preference data associated with the user profile identifier, group profile identifier, and/or notification data 515. Alternatively, the notification component 265/365 may receive notification system preference data 525 representing one or more notification system preferences associated with the user profile identifier, group profile identifier, and/or notification data 515. For example, the notification system preference data 525 may represent a first notification system preference associated with first notification data in the notification data 515, may represent the first notification system preference and a second notification system preference associated with second notification data in the notification data 515, etc.

The notification component 265/365 sends the notification data 515 and the notification system preference data 525 to the notification skill component 290a/390a. The notification component 265/365 may send the notification data 515 and the notification system preference data 525 to the notification skill component 290a/390a in a same or separate data transmissions.

The notification skill component 290a/390a may also query the profile storage 270/370 for user/group preference data 535 (for ordering output of notifications) associated with the user profile identifier and/or group profile identifier. The user/group preference data 535 may represent one or more user/group preferences for ordering the output of notifications. For example, a user/group preference may represent a certain notification type is to be output prior to any other notification type. For further example, a user/group preference may represent a first notification type is to be output prior to a second notification type (e.g., news notifications are to be output prior to restaurant coupon notifications).

In at least some embodiments, notification data may be intended for output to a unit of a business. For example, a property manager system (such as that of a hotel) may output notification data corresponding to "the buffet is ready." Thus, in at least some embodiments, the profile storage 270/370 may store enterprise-specific preferences, with an enterprise-specific preference representing a preferred location in which a notification type is to be included in a digest of notification summaries.

The system 120/device 110 may be configured to, after outputting a plurality of notifications to a user, query the user as to whether the user liked or disliked the output order and, if the user disliked the output order, how the user would recommend the ordering be adjusted. The user response to such a query may be embodied in user feedback data stored in a user feedback storage 510. The user feedback storage 510 may be implemented by the system 120 or the device 110.

The notification skill component 290a/390a may query the user feedback storage 510 for user feedback data 545 associated with the user profile identifier and/or group profile identifier. The user feedback storage 510 may store, for a given instance of a previous output plurality of notifications, either positive user feedback data (representing the user, that received the plurality of notifications, liked the order in which the plurality of notifications were output) or negative user feedback data (representing the user, that received the plurality of notifications, did not like the order in which the plurality of notifications were output). Moreover, an instance of negative user feedback data, in the user feedback storage 510, may be associated with a user recommendation for beneficially changing an output order of one or more notification types (e.g., may represent a notification type should be output prior to another notification type). Such recommendation may be used to update an initial ordering of notifications generated based on one or more default ordering rules. The user feedback data 545 may include one or more instances of negative user feedback data associated with respective user recommendations.

The notification skill component 290a/390a may query a default ordering rules storage 520 for default ordering rules data 555. The default ordering rules storage 520 may be implemented by the system 120 or the device 110. The default ordering rules data 555 may represent one or more default rules for ordering notification types of a plurality of notification types to be output. For example, a default ordering rule may indicate notifications, corresponding to life critical notification type (e.g., severe weather notifications, Amber alert notifications, crime notifications, and the like), are to be output prior to all other notification types. For further example, a default ordering rule may indicate notifications, corresponding to a first notification type, are to be output prior to notifications corresponding to one or more other particular notification types.

For further example, a default ordering rule may indicate notifications, provided by trusted notification systems, are to be output prior to notifications received from untrusted notification systems. A notification system may be trusted if a rating (e.g., a satisfaction rating derived from user feedback data, a popularity rating derived from a number of times users interact with the notification system, a personalized rated based on user-specific data, etc.), associated with the notification system, satisfies a condition (e.g., meets or exceeds a threshold rating/score). Conversely, a notification system may be untrusted if a rating (or other score), associated with the notification system, fails to satisfy a condition (e.g., fails to meet or exceed the threshold rating/score).

In another example, a default ordering rule may indicate notification types, subscribed to by a user, are to be output prior to notification types determined by the system 120/device 110 to be relevant to the user (e.g., coupon notifications). The notifications types, determined by the system 120/device 110 to be relevant to the user) may be referred to as inferred notification types. The default ordering rule may indicate notification types, subscribed to by the user, are to be output prior to notification types recommended for the user based on, for example, system functionality previously invoked by the user and user preferences represented in user profile data.

In a further example, a default ordering rule may indicate multi-turn notifications are to be output after single-turn notifications. A multi-turn notification refers to a notification that requires multiple user inputs and corresponding system outputs in order for an entirety of the notification to be output. Conversely, a non-multi-turn notification refers to a notification that is output, in its entirety, in response to a single user input requesting output of the particular notification.

In another example, a default ordering rule may indicate notifications, associated with output durations meeting or exceeding a threshold duration of time, are to be output after notifications associated with output durations failing to meet or exceed the threshold duration of time.

In a further example, a default ordering rule may indicate, when a user requests output of notifications using a device associated with a group profile identifier, that notifications intended for the user are to be output prior to notifications intended for the group of users associated with the group profile identifier. At runtime a user may provide a user input (requesting the output notifications) to a device 110 associated with a group profile identifier. The user recognition component 295/395 may perform user recognition processing to determine the user corresponds to a particular user profile identifier. The notification skill component 290a/390a may query the notification component 265/365 for first notification data (corresponding to one or more notifications) associated with the group profile identifier (associated with the device 110 that received the user input). The notification skill component 290a/390a may also query the notification component 265/365 for second notification data (corresponding to one or more notifications) associated with the user profile identifier (corresponding to the user that provided the user input). Using the foregoing default ordering rule, the notification skill component 290a/390a may determine the second notification data is to be output prior to the first notification data based on the second notification data and the first notification data being associated with the user profile identifier and the group profile identifier, respectively.

In another example, a default ordering rule may indicate notifications are to be output based on when the notification component 265/365 received corresponding notification data. For example, the default ordering rule may indicate notification data that was received first in time is to be output prior to notification data that was received second in time, which is to be output prior to notification data received third in time, etc.

In at least some examples, a default ordering rule may indicate, life critical notification type notifications are to be output prior to non-multi-turn user-requested notifications from trusted notification systems, which are to be output prior to multi-turn user-requested notifications from trusted notification systems, which are to be output prior to non-multi-turn user-requested notifications from untrusted notification systems, which are to be output prior to multi-turn user-requested notifications from untrusted notification systems.

In at least some examples, a default ordering rule may indicate, life critical notification type notifications are to be output prior to non-multi-turn inferred notifications from trusted notification systems, which are to be output prior to multi-turn inferred notifications from trusted notification systems, which are to be output prior to non-multi-turn inferred notifications from untrusted notification systems, which are to be output prior to multi-turn inferred notifications from untrusted notification systems.

The notification skill component 290a/390a generates an ordering (of the plurality of notifications represented in the notification data 515) based on the notification system preference data 525, the user/group preference data 535, the user feedback data 545, and the default ordering rule data 555. In at least some embodiments, the notification skill component 290a/390a may implement a rules engine that processes the notification system preference data 525, the user/group preference data 535, the user feedback data 545, and the default ordering rule data 555 to determine the ordering. In at least some embodiments, the notification skill component 290*a*/390*a* may implement a heuristics-based algorithm (or other type of algorithm) that takes into consideration the notification system preference data 525, the user/group preference data 535, the user feedback data 545, and the default ordering rule data 555 for determining the ordering. In at least some embodiments, the notification skill component 290*a*/390*a* may implement a machine learning model that processes the notification system preference data 525, the user/group preference data 535, the user feedback data 545, and the default ordering rule data 555 to determine the ordering.

In at least some embodiments, the notification skill component 290*a*/390*a* may generate an initial ordering of notifications based on the default rule data 555, and may update the initial ordering of notifications based on the user/group preference data 535, the user feedback data 545, and/or the notification system preference data 525 (to the extent such data exists for updating the initial ordering). Nonetheless, in at least some embodiments, the notification skill component 290*a*/390*a* may output life critical skill type notifications first regardless of the user/group preference data 535, the user feedback data 545, and/or the notification system preference data 525.

The notification skill component 290*a*/390*a* may generate natural language notification data for each different structured, tagged, non-natural language notification data represented in the notification data 515. In at least some embodiments, the notification skill component 290*a*/390*a* may use a template-based approach to generate natural language notification data. A template may include natural language with portions (e.g., variables) to be populated with information from the structured, tagged, non-natural language first notification. A template may be associated with a notification system 135. A template may additionally or alternatively be associated with a notification type. For example, a calendar event notification template may include the natural language "your calendar entry titled [event title] is starting in [time information]," with [event title] and [time information] corresponding to portions to be populated. For further example, an email notification template may include the natural language "you received an email from [sender name] [time information] ago," with [sender name] and [time information] corresponding to portions to be populated. In another example, a sporting event notification template may include the natural language "the [team name] game is starting in [time information]," with [team name] and [time information] corresponding to portions to be populated. For further example, a weather notification template may include the natural language "it will be [weather type] at your location in about [time information]," with [weather type] and [time information] corresponding to portions to be populated. In another example, a taxi arrival notification template may include the natural language "your ride from [taxi service name] is expected to arrive in [time information], be on the lookout for a [vehicle information] having license plate number [license plate number] at [pickup location]," with [taxi service name], [time information], [vehicle information], [license plate number], and [pickup location] corresponding to portions to be populated. For further example, a product delivery notification template may include the natural language "your [product name] will be delivered in [time information]," with [product name] and [time information] corresponding to portions to be populated. In another example, a television show notification template may include the natural language "[television show title] is starting in [time information]," with [televisions show title] and [time information] corresponding to portions to be populated.

The notification skill component 290*a*/390*a* may determine a notification type corresponding to the structured, tagged, non-natural language notification data represented in the notification data 515. Thereafter, the notification skill component 290*a*/390*a* may determine template data corresponding to a notification template associated with the notification type of the structured, tagged, non-natural language notification data and/or the notification system 135 that provided the structured, tagged, non-natural language notification data.

The notification skill component 290*a*/390*a* may generate the natural language data using the template data and the structured, tagged, non-natural language notification data. For example, the structured, tagged, non-natural language notification data may correspond to "EventTitle: Meeting with John; Time: 15 minutes," and the template data may correspond to the natural language "your calendar entry titled [event title] is starting in [time information]." In this example, the natural language notification data may be "your calendar entry titled meeting with John is starting in 15 minutes." For further example, the structured, tagged, non-natural language notification data may correspond to "SenderName: Jane; Time: 2 minutes," and the template data may correspond to the natural language "you received an email from [sender name] [time information] ago.". In this example, the natural language notification data may be "you received an email from Jane 2 minutes ago." In another example, the structured, tagged, non-natural language notification data may correspond to "SportsTeamName: Seahawks; Time: 30 minutes," and the template data may correspond to the natural language "the [team name] game is starting in [time information]." In this example, the natural language notification data may be "the Seahawks game is starting in 30 minutes."

Alternatively, the notification skill component 290*a*/390*a* may perform one or more art-known/industry-known natural language generation processing techniques on the structured, tagged, non-natural language notification data to generate the natural language notification data.

In at least some embodiments, the notification skill component 290*a*/390*a* may determine the natural language notification data (corresponding to the various structured, tagged, non-natural language data represented in the notification data 515) is to be output as audio. In such embodiments, the notification skill component 290*a*/390*a* may send the natural language notification data (of each notification represented in the notification data 515) to the TTS component 280/380, and the TTS component 280/380 may perform TTS processing on each instance of natural language notification data to generate different instances of audio data including synthesized speech corresponding to respective natural language notification data. The notification skill component 290*a*/390*b* may then cause the different audio data (corresponding to the different natural language synthesized speech of the different notifications) to be sent to the device 110 and output by the device 110 in the order determined by the notification skill component 290*a*/390*a* as described herein above. This may include the notification skill component 290*a*/390*b* causing order data to be sent to the device 110, with the order data representing the order determined by the notification skill component 290*a*/390*a* as described herein above.

In at least some embodiments, the notification skill component 290*a*/390*a* may generate ordered natural language notification data corresponding to the different instances of the natural language notification data in the order determined by the notification skill component 290a/390a as described herein above. In such embodiments, the notification skill component 290a/390a may send the ordered natural language notification data to the TTS component 280/380, and the TTS component 280/380 may perform TTS processing on the ordered natural language notification data to generate audio data including synthesized speech corresponding to ordered natural language notification data. The notification skill component 290a/390b may then cause the audio data to be sent to the device 110 for output.

Additionally or alternatively, the notification skill component 290a/390a may determine the natural language notification data (corresponding to the various structured, tagged, non-natural language data represented in the notification data 515) is to be displayed as natural language text. In such embodiments, the notification skill component 290a/390a may cause different instances of natural language text data (each corresponding to a different instance of natural language notification data) to be sent to the device 110 and displayed by the device 110 (using a display of or otherwise associated with the device 110) in the order determined by the notification skill component 290a/390a as described herein above. This may include the notification skill component 290a/390b causing order data to be sent to the device 110, with the order data representing the order determined by the notification skill component 290a/390a as described herein above. In at least some embodiments, the notification skill component 290a/390a may send a single instance of natural language text data (corresponding to the ordered natural language notification data) to be sent to the device 110 for output. In at least some embodiments, the device 110 may display natural language text (corresponding to different notifications) in a list format.

In at least some embodiments, the notification skill component 290a/390a may cause one or more devices, associated with the same user profile data and/or group profile data as the device 110 that captured the user input requesting notifications be output, to output the foregoing synthesized speech and/or display the foregoing natural language text.

In at least some embodiments, the notification skill component 290a/390a may receive notification system preference data 435 (representing a preference of the notification system 135 as to how (e.g., as audio or text) a notification is to be output to a user, and the notification skill component 290a/390a may cause the device 110 to output natural language (corresponding to ordered notifications) according to the notification system preference data 435.

In at least some embodiments, instead of outputting natural language notification data in a particular order, the notification skill component 290a/390a may cause a natural language digest (representing summaries of different notifications in a particular order) to be output. For example, the notification skill component 290a/390a may use the herein described template-based and/or natural language generation techniques to generate, for each different instance of notification data represented in the notification data 455, natural language summary data corresponding to a natural language summary of the corresponding instance of notification data. For example, with reference to FIG. 6, the notification skill component 290a/390a may, using a herein described template-based and/or natural language generation technique, generate (602) first natural language summary data corresponding to a natural language summary of first notification data represented in the notification data 515. The notification skill component 290a/390a may repeat this processing, for each instance of notification data in the notification data 515, until the notification skill component 290a/390a generates (604) nth natural language summary data corresponding to a natural language summary of nth notification data represented in the notification data 515. For example, a single instance of natural language summary data (corresponding to a single instance of notification data represented in the notification data 515) may correspond to "you received a [notification type] notification from [notification system name]," "you also received a [notification type] notification from [notification system name]," or the like. The notification skill component 290a/390a may generate (606) ordered natural language summary data that includes the various instances of natural language summary data ordered based on the output order determined by the notification skill component 290a/390a as described herein above.

In at least some embodiments, a notification system 135 may output notification data including natural language notification content. In such embodiments, the notification skill component 290a/390a may use the herein described template-based and/or natural language generation techniques to generate natural language summary data corresponding to a natural language summary of the natural language notification content output by the notification system 135.

In at least some embodiments, the notification skill component 290a/390a may determine the ordered notification summary data is to be output as audio. In such embodiments, the notification skill component 290a/390a may cause (608) TTS processing to be performed on the ordered natural language summary data to generate audio data including synthesized speech corresponding to the ordered natural language summary data. More specifically, the notification skill component 290a/390a may send the ordered natural language summary data to the TTS component 280/380, and the TTS component 280/380 may perform TTS processing on the ordered natural language summary data to generate audio data including synthesized speech corresponding to the ordered natural language summary data. The notification skill component 290a/390b may then cause (610) the audio data to be sent to the device 110 for output.

Figure 7:
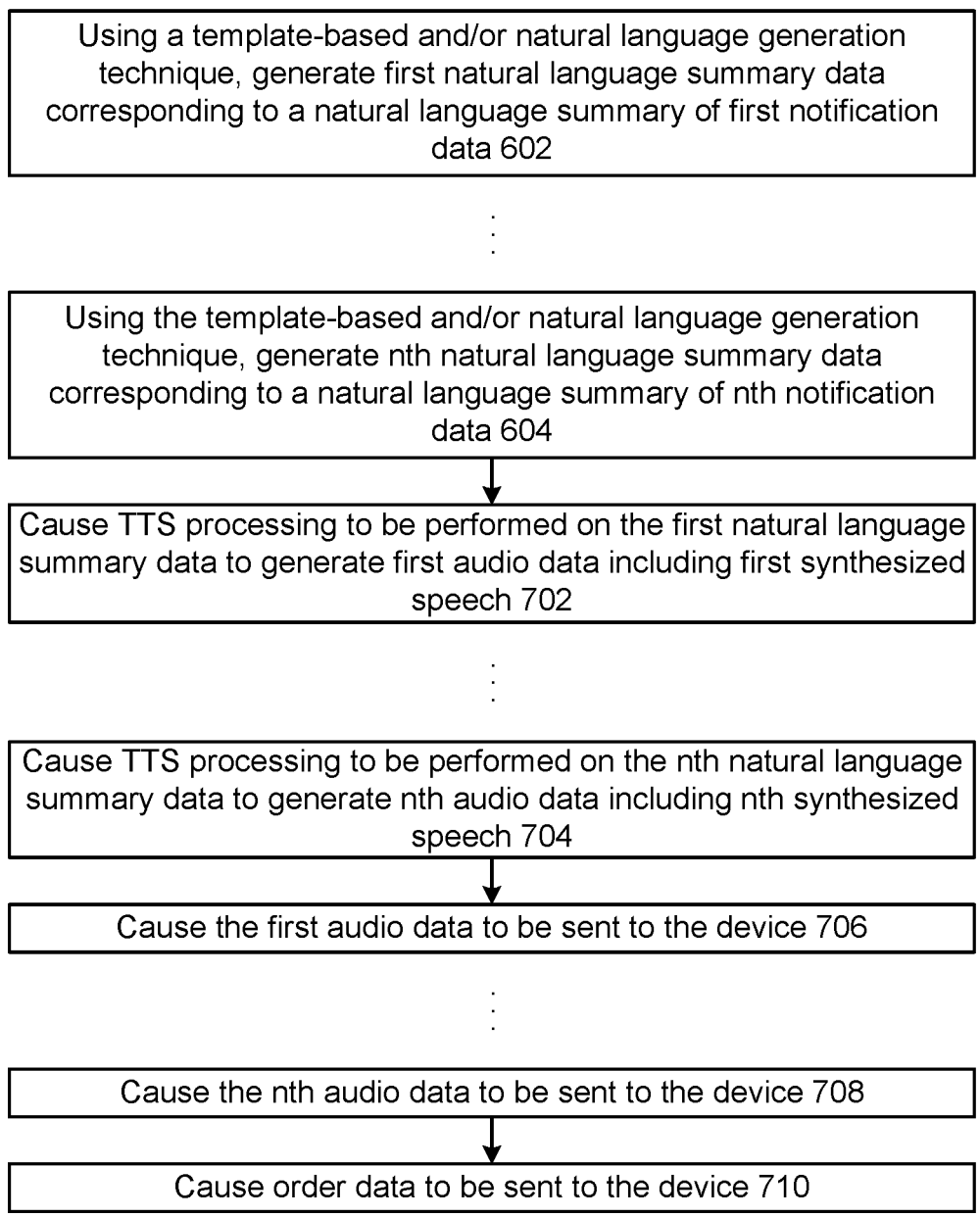
FIG. 7 is a process flow diagram illustrating how a digest, summarizing a plurality of notifications, may be generated and output, according to embodiments of the present disclosure.

In at least some embodiments, the notification skill component 290a/390a may send the different instances of natural language summary data to the TTS component 280/380, and the TTS component 280/380 may perform TTS processing on each instance of natural language summary data to generate different instances of audio data including synthesized speech corresponding to respective natural language summary data. With reference to FIG. 7, the notification skill component 290a/390a may, using a herein described template-based and/or natural language generation technique, generate (602) first natural language summary data corresponding to a natural language summary of first notification data represented in the notification data 515. The notification skill component 290a/390a may repeat this processing, for each instance of notification data in the notification data 515, until the notification skill component 290a/390a generates (604) nth natural language summary data corresponding to a natural language summary of nth notification data represented in the notification data 515.

The notification skill component 290a/390a may cause (702) TTS processing to be performed on the first natural language summary data to generate first audio data including first synthesized speech corresponding to the first natural language summary data. The notification skill component 290a/390a may repeat this, for each instance of natural language summary data, until the notification skill component 290a/390a causes (704) TTS processing to be performed on the nth natural language summary data to generate nth audio data including nth synthesized speech corresponding to the nth natural language summary data.

Thereafter, the notification skill component 290a/390b may cause the different audio data (corresponding to the different natural language synthesized speech of the different summaries) to be sent to the device 110 and output by the device 110 in the order determined by the notification skill component 290a/390a as described herein above. Specifically, the notification skill component 290a/390a may cause (706) the first audio data to be sent to the device 110, cause (708) the nth audio data to be sent to the device 110, and cause (710) order data to be sent to the device 110, with the order data representing an order in which the synthesized speech of the different summaries are to be output. An order in which the audio data is sent to the device 110 may or may not conform to an order in which the synthesized speech is to be output.

Additionally or alternatively, the notification skill component 290a/390a may determine the different instances of natural language summary data are to be displayed as natural language text. In such embodiments, the notification skill component 290a/390a may cause different instances of natural language text data (each corresponding to a different instance of natural language summary data) to be sent to the device 110 and displayed by the device 110 (using a display of or otherwise associated with the device 110) in the order determined by the notification skill component 290a/390a as described herein above. This may include the notification skill component 290a/390b causing order data to be sent to the device 110, with the order data representing the order determined by the notification skill component 290a/390a as described herein above. In at least some embodiments, the notification skill component 290a/390a may send a single instance of natural language text data (corresponding to the ordered natural language summary data) to be sent to the device 110 for output. In at least some embodiments, the device 110 may display natural language text (corresponding to different notification summaries) in a list format.

In at least some embodiments, the notification skill component 290a/390a may receive notification system preference data 435 (representing a preference of the notification system 135 as to how (e.g., as audio or text) a notification is to be output to a user, and the notification skill component 290a/390a may cause the device 110 to output ordered natural language notification summaries according to the notification system preference data 435.

In at least some embodiments, the notification skill component 290a/390a may cause one or more devices, associated with the same user profile data and/or group profile data as the device 110 that captured the user input requesting notifications be output, to output the foregoing synthesized speech and/or display the foregoing natural language text corresponding to notification summaries.

Figure 8:
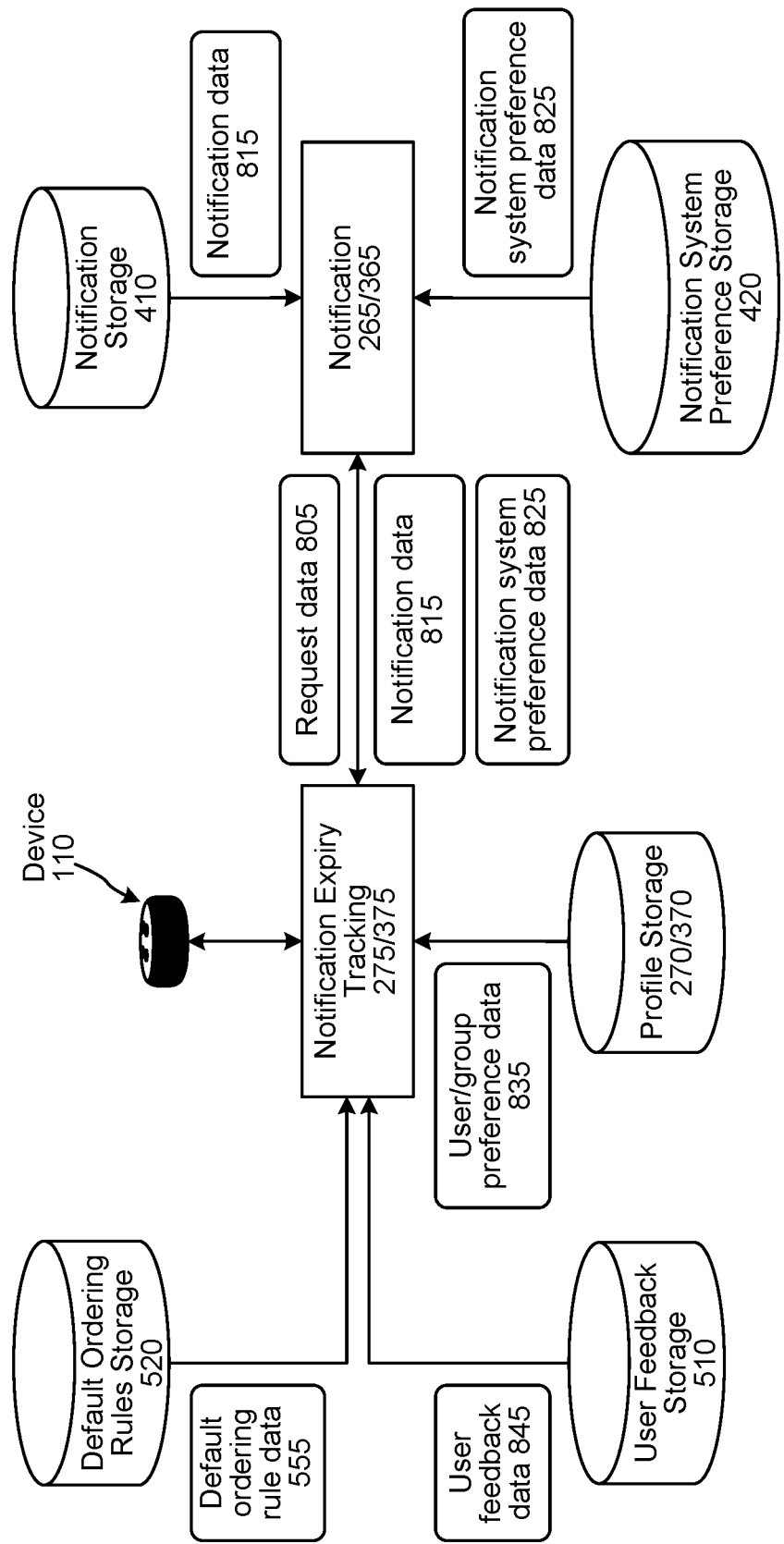
FIG. 8 is a conceptual diagram of components for outputting an expiring notification, according to embodiments of the present disclosure.

In at least some embodiments, the system 120/device 110 may be configured to proactively (i.e., not in response to a user input) output expiring notifications (or a summary of notifications) in an ordered manner. With reference to FIG. 8, the notification expiry tracking component 275/375 sends, to the notification component 265/365, request data 805 requesting notification data that is expiring within a threshold amount of time (e.g., within the next minute, within the next two minutes, within the next 5 minutes, etc.).

In response to receiving the request data 805, the notification component 265/365 queries the notification storage 410 for notification data expiring within the threshold amount of time. In response, the notification component 265/365 receives notification data 815 representing separate instances of notification data, associated with a same user profile identifier and/or group profile identifier in the notification storage 410, and which is associated with an expiration time within the threshold amount of time. In at least some embodiments, the expiration time of notification data may be an expiration time represented in a notification system preference stored in the notification system preference storage 420 with respect to the notification data. For example, a notification system preference may represent notification data is to be output at 10:00 am and the present time may be 9:58 am.

The notification component 265/365 may query the notification system preference storage 420 for notification system preference data associated with the plurality of separate instances of notification data embodied in the notification data 815. In response, the notification component 265/365 may receive a null value in instances where the notification system preference storage 420 does not include any notification system preference data associated with notification data 815. Alternatively, the notification component 265/365 may receive notification system preference data 825 representing one or more notification system preferences associated with the notification data 815. For example, the notification system preference data 525 may represent a first notification system preference associated with first notification data in the notification data 815, may represent the first notification system preference and a second notification system preference associated with second notification data in the notification data 815, etc.

The notification component 265/365 sends the notification data 815 and the notification system preference data 825 to the notification expiry tracking component 275/375. The notification component 265/365 may send the notification data 515 and the notification system preference data 525 to the notification expiry tracking component 275/375 in a same or separate data transmissions.

The notification expiry tracking component 275/375 may also query the profile storage 270/370 for user/group preference data 835 associated with the user profile identifier and/or group profile identifier associated with the notification data 815. The user/group preference data 835 may represent one or more user/group preferences for ordering the output of notifications. For example, a user/group preference may represent a certain notification type is to be output prior to any other notification type. For further example, a user/group preference may represent a first notification type is to be output prior to a second notification type (e.g., news notifications are to be output prior to restaurant coupon notifications).

The notification expiry tracking component 275/375 may query the user feedback storage 510 for user feedback data 845 associated with the user profile identifier and/or group profile identifier associated with the notification data 815. The user feedback storage 510 may store, for a given instance of a previous output plurality of notifications, either positive user feedback data (representing the user, that received the plurality of notifications, liked the order in which the plurality of notifications were output) or negative user feedback data (representing the user, that received the plurality of notifications, did not like the order in which the plurality of notifications were output). Moreover, an instance of negative user feedback data, in the user feedback storage 510, may be associated with a user recommendation for beneficially changing an output order of one or more notification types (e.g., may represent a notification type should be output prior to another notification type). Such recommendation may be used to update an initial ordering of notifications generated based on one more ore default ordering rules. The user feedback data 845 may include one or more instances of negative user feedback data associated with respective user recommendations.

The notification expiry tracking component 275/375 may query the default ordering rules storage 520 for the default ordering rules data 555.

The notification expiry tracking component 275/375 generates an ordering (of the plurality of notifications represented in the notification data 655) based on the notification system preference data 825, the user/group preference data 835, the user feedback data 845, and the default ordering rule data 555. In at least some embodiments, the notification expiry tracking component 275/375 may generate an initial ordering of notifications based on the default rule data 555, and may update the initial ordering of notifications based on the user/group preference data 835, the user feedback data 845, and/or the notification system preference data 825 (to the extent such data exists for updating the initial ordering). Nonetheless, in at least some embodiments, the notification expiry tracking component 275/375 may output life critical skill type notifications first regardless of the user/group preference data 835, the user feedback data 845, and/or the notification system preference data 825.

The notification expiry tracking component 275/375 may generate natural language notification data for each different structured, tagged, non-natural language notification data represented in the notification data 655. The notification expiry tracking component 275/375 may perform processing (e.g., template-based processing and/or natural language generate processing), as described herein above with respect to the notification skill component 290a/390a, to generate the natural language notification data.

In at least some embodiments, the notification expiry tracking component 275/375 may determine the natural language notification data (corresponding to the various structured, tagged, non-natural language data represented in the notification data 655) is to be output as audio. In such embodiments, the notification expiry tracking component 275/375 may send the natural language notification data (of each notification represented in the notification data 815) to the TTS component 280/380, and the TTS component 280/380 may perform TTS processing on each instance of natural language notification data to generate different instances of audio data including synthesized speech corresponding to respective natural language notification data. The notification expiry tracking component 275/375 may then cause the different audio data (corresponding to the different natural language synthesized speech of the different notifications) to be sent to a device 110 (associated with the user profile identifier and/or group profile identifier associated with the notification data 815) and output by the device 110 (without first receiving a user input requesting output of the notifications) in the order determined by the notification expiry tracking component 275/375. This may include the notification expiry tracking component 275/375 causing order data to be sent to the device 110, with the order data representing the order determined by the notification expiry tracking component 275/375.

In at least some embodiments, the notification expiry tracking component 275/375 may generate ordered natural language notification data corresponding to the different instances of the natural language notification data in the order determined by the notification expiry tracking component 275/375. In such embodiments, the notification expiry tracking component 275/375 may send the ordered natural language notification data to the TTS component 280/380, and the TTS component 280/380 may perform TTS processing on the ordered natural language notification data to generate audio data including synthesized speech corresponding to ordered natural language notification data. The notification expiry tracking component 275/375 may then cause the audio data to be sent to the device 110 for output (without receiving a user input to output the notifications).

Additionally or alternatively, the notification expiry tracking component 275/375 may determine the natural language notification data (corresponding to the various structured, tagged, non-natural language data represented in the notification data 815) is to be displayed as natural language text. In such embodiments, the notification expiry tracking component 275/375 may cause different instances of natural language text data (each corresponding to a different instance of natural language notification data) to be sent to the device 110 and displayed by the device 110 (using a display of or otherwise associated with the device 110, and without receiving a user input requesting output of the notifications) in the order determined by the notification expiry tracking component 275/375. This may include the notification expiry tracking component 275/375 causing order data to be sent to the device 110, with the order data representing the order determined by the notification expiry tracking component 275/375. In at least some embodiments, the notification expiry tracking component 275/375 may send a single instance of natural language text data (corresponding to the ordered natural language notification data) to be sent to the device 110 for output. In at least some embodiments, the device 110 may display natural language text (corresponding to different notifications) in a list format. In at least some embodiments, the foregoing sending of data to the device 110 may be embodied as a mobile push notification.

In at least some embodiments, the notification expiry tracking component 275/375 may cause one or more devices, associated with the same user profile data and/or group profile data, to output the foregoing synthesized speech and/or display the foregoing natural language text. In at least some embodiments, the notification expiry tracking component 275/375 may strategically determine which, of a group of related devices, is to output the foregoing synthesized speech and/or display the foregoing natural language text based on presence data. A device 110 may generate presence data representing when the device 110 detects presence of a user (e.g., via image analysis, speech detection, etc.). The notification expiry tracking component 275/375 may determine a user profile identifier and/or group profile identifier associated with the notification data 515, determine a plurality of devices 110 associated with the user profile identifier and/or group profile identifier, determine one or more of the devices that are presently outputting (or associated with) presence data, and cause the one or more devices to output the synthesized speech and/or display the natural language text.

In at least some embodiments, instead of outputting natural language notification data in a particular order, the notification expiry tracking component 275/375 may cause a natural language digest (representing summaries of different notifications in a particular order) to be output. For example, the notification expiry tracking component 275/375 may use the herein described template-based and/or natural language generation techniques to generate, for each different instance of notification data represented in the notification data 815, natural language summary data corresponding to a natural language summary of the corresponding instance of notification data. The notification expiry tracking component 275/375 may generate ordered natural language summary data that includes the various instances of natural language summary data ordered based on the output order determined by the notification expiry tracking component 275/375.

In at least some embodiments, the notification expiry tracking component 275/375 may determine the ordered notification summary data is to be output as audio. In such embodiments, the notification expiry tracking component 275/375 may send the ordered natural language summary data to the TTS component 280/380, and the TTS component 280/380 may perform TTS processing on the ordered natural language summary data to generate audio data including synthesized speech corresponding to the ordered natural language summary data. The notification expiry tracking component 275/375 may then cause the audio data to be sent to a device 110 associated with the user profile identifier and/or group profile identifier associated with the notification data 515.

In at least some embodiments, the notification expiry tracking component 275/375 may send the different instances of natural language summary data to the TTS component 280/380, and the TTS component 280/380 may perform TTS processing on each instance of natural language summary data to generate different instances of audio data including synthesized speech corresponding to respective natural language summary data. The notification expiry tracking component 275/375 may then cause the different audio data (corresponding to the different natural language synthesized speech of the different summaries) to be sent to a device 110 (associated with the user profile identifier and/or group profile identifier associated with the notification data 815) and output by the device 110 in the order determined by the notification expiry tracking component 275/375. This may include the notification expiry tracking component 275/375 causing order data to be sent to the device 110, with the order data representing the order determined by the notification expiry tracking component 275/375.

Additionally or alternatively, the notification expiry tracking component 275/375 may determine the different instances of natural language summary data are to be displayed as natural language text. In such embodiments, the notification expiry tracking component 275/375 may cause different instances of natural language text data (each corresponding to a different instance of natural language summary data) to be sent to a device 110 (associated with the user profile identifier and/or group profile identifier associated with the notification data 815) and displayed by the device 110 (using a display of or otherwise associated with the device 110) in the order determined by the notification expiry tracking component 275/375. This may include the notification expiry tracking component 275/375 causing order data to be sent to the device 110, with the order data representing the order determined by the notification expiry tracking component 275/375. In at least some embodiments, the notification expiry tracking component 275/375 may send a single instance of natural language text data (corresponding to the ordered natural language summary data) to the device 110 for output. In at least some embodiments, the device 110 may display natural language text (corresponding to different notification summaries) in a list format. In at least some embodiments, the foregoing sending of data to the device 110 may be embodied as a mobile push notification.

In at least some embodiments, the notification expiry tracking component 275/375 may cause one or more devices, associated with the same user profile data and/or group profile data, to output the foregoing synthesized speech and/or display the foregoing natural language text corresponding to notification summaries. In at least some embodiments, the notification expiry tracking component 275/375 may strategically determine which, of a group of related devices, is to output the foregoing synthesized speech and/or display the foregoing natural language text based on presence data. A device 110 may generate presence data representing when the device 110 detects presence of a user (e.g., via image analysis, speech detection, etc.). The notification expiry tracking component 275/375 may determine a user profile identifier and/or group profile identifier associated with the notification data 515, determine a plurality of devices 110 associated with the user profile identifier and/or group profile identifier, determine one or more of the devices that are presently outputting (or associated with) presence data, and cause the one or more devices to output the synthesized speech and/or display the natural language text.

In at least some embodiments, the notification expiry tracking component 275/375 may only perform the foregoing processing with respect to certain notification types. To facilitate such, the request data 805 may request expiring notifications associated with one or more specific notification types. In response, the notification data 815 may include a plurality of notification data corresponding to only the requested notification type(s). Alternatively, the notification expiry tracking component 275/375 may receive notification data 815 without restriction as to notification type, and may only output notification data or summaries of notification data (included in the notification data 815) corresponding to one or more specific notification types.

In at least some embodiments, the notification expiry tracking component 275/375 may cause expired notification data to be deleted from the notification storage 410.

Figure 9:
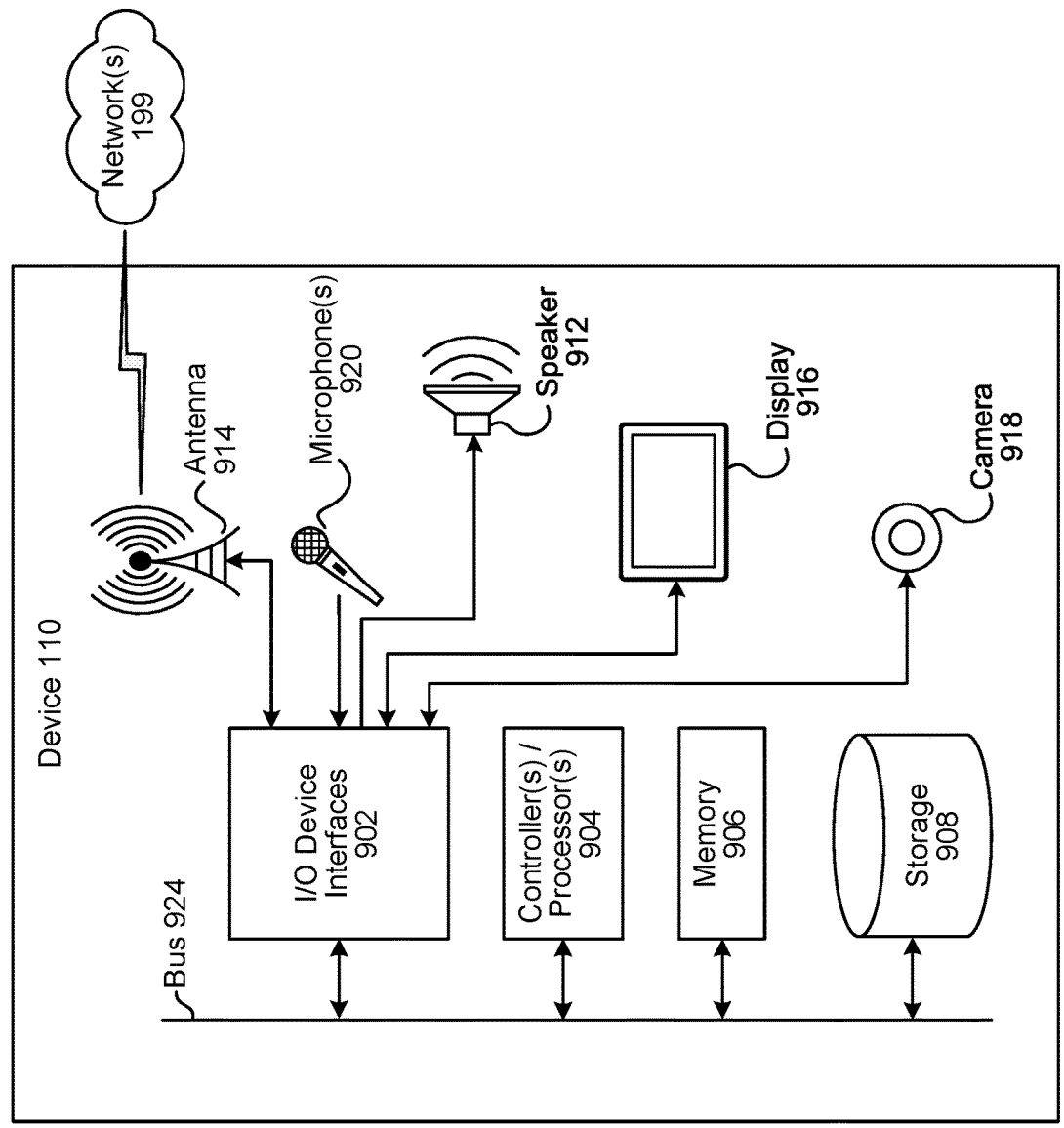
FIG. 9 is a block diagram conceptually illustrating example components of a device, according to embodiments of the present disclosure.
Figure 10:
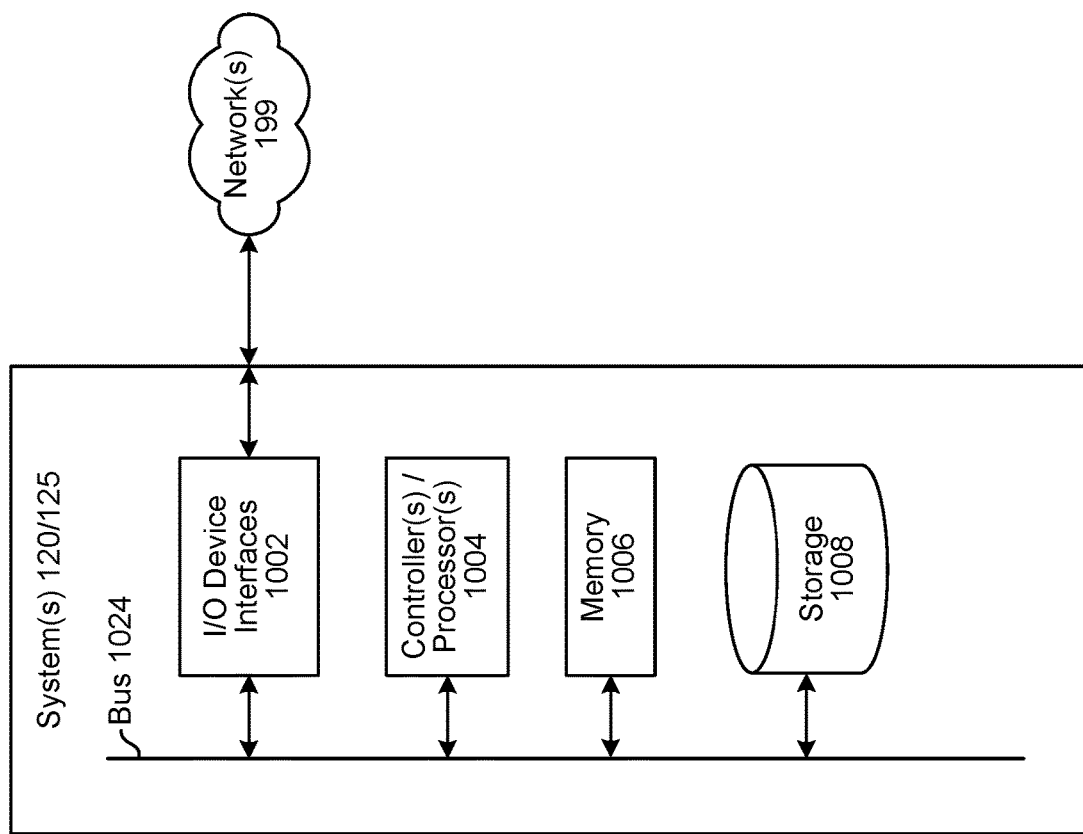
FIG. 10 is a block diagram conceptually illustrating example components of a system, according to embodiments of the present disclosure.

FIG. 9 is a block diagram conceptually illustrating example components of a device 110 according to the present disclosure. FIG. 10 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (902/1002), processor(s) (904/1004), memory (906/1006), and/or storage (908/1008) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 11:
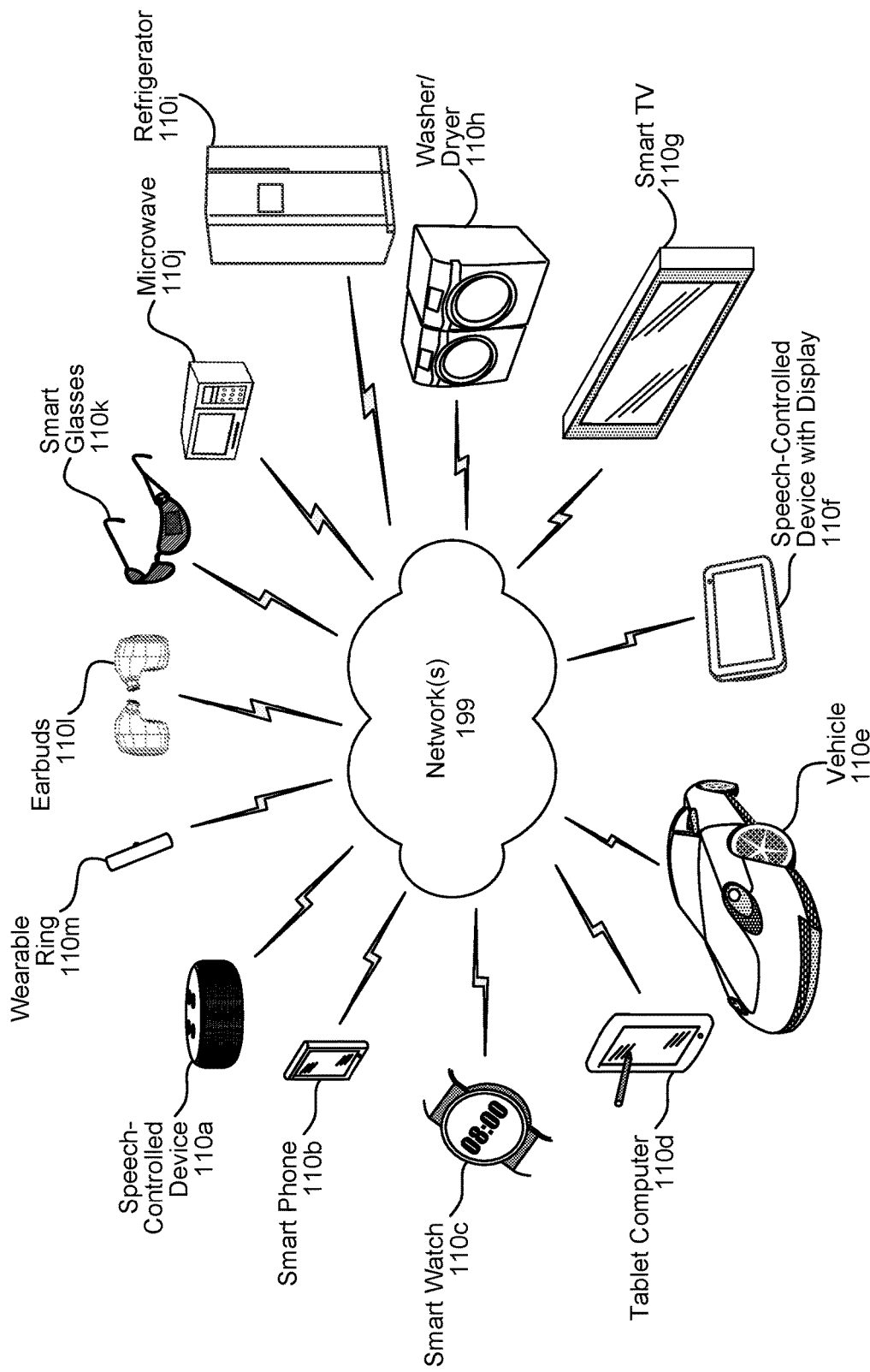
FIG. 11 illustrates an example of a computer network for use with the overall system, according to embodiments of the present disclosure.

As illustrated in FIG. 11, multiple devices (110a-1101) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, smart glasses 110k, earbuds 1101, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first notification data intended for at least a first recipient user;
   receiving second notification data intended for the at least first recipient user;
   after receiving the first notification data and the second notification data, receiving, from a first device, first audio data representing a first spoken natural language input;
   processing the first audio data to determine the first spoken natural language input requests output corresponding to the first notification data and the second notification data;
   after processing the first audio data:
      determining the first notification data and the second notification data;
      generating first natural language summary data corresponding to a first natural language summary of the first notification data;
      generating second natural language summary data corresponding to a second natural language summary of the second notification data;
      determining system-configured rule data representing a rule to output a first notification content type first with respect to a plurality of notification content types;
      generating ordered natural language summary data comprising the first natural language summary data and the second natural language summary data ordered based on the first notification data corresponding to the first notification content type;
      performing text-to-speech (TTS) processing on the ordered natural language summary data to generate second audio data comprising synthesized speech corresponding to the ordered natural language summary data; and
      sending the second audio data to the first device for output.

2. The computer-implemented method of claim 1, further comprising:
   determining the system-configured rule data represents a first summary, corresponding to a first notification having a first output duration less than a threshold output duration, is to be output before a second summary corresponding to a second notification having a second output duration meeting or exceeding the threshold output duration;
   determining a third output duration associated with the first notification data;
   determining a fourth output duration associated with the second notification data;
   determining the third output duration is less than the threshold output duration;
   determining the fourth output duration meets or exceeds the threshold output duration; and
   based at least in part on the third output duration being less than the threshold output duration and the fourth output duration meeting or exceeding the threshold output duration, generating the ordered natural language summary data to represent the first natural language summary data is output before the second natural language summary data.

3. The computer-implemented method of claim 1, further comprising:
   receiving system preference data representing a system preference to output the first notification data first with respect to a plurality of notifications; and
   based at least in part on the system preference data, generating the ordered natural language summary data to represent the first natural language summary data is output before the second natural language summary data.

4. The computer-implemented method of claim 1, further comprising:
   receiving user feedback data associated with outputting of previous ordered natural language summary data, the user feedback data representing a second notification type is to be output before a third notification type;
   determining the first notification data corresponds to the second notification type;
   determining the second notification data corresponds to the third notification type; and
   generating the ordered natural language summary data to represent the first natural language summary data is output before the second natural language summary data.

5. A computer-implemented method comprising:
   receiving first data representing a first notification associated with first content;
   receiving second data representing a second notification associated with second content that is different than the first content;

generating first output data corresponding to a first natural language summary of the first content;
generating second output data corresponding to a second natural language summary of the second content;
determining first rule data based on the first content corresponding to a first content type of the first rule data;
based at least in part on the first rule data, determining the first output data is to be presented before the second output data; and
causing the first output data to be presented before the second output data.

6. The computer-implemented method of claim 5, further comprising:
after receiving the first data and the second data, receiving audio data representing a spoken natural language input;
processing the audio data to determine the spoken natural language input requests output corresponding to the first data and the second data; and
after determining the spoken natural language input requests the output, causing the first output data to be presented before the second output data.

7. The computer-implemented method of claim 6, further comprising:
determining a user profile identifier associated with the audio data;
determining the first data is associated with a first user profile identifier;
determining the second data is associated with a plurality of user profile identifiers comprising the first user profile identifier; and
based at least in part on the first data being associated with the first user profile identifier and the second data being associated with the plurality of user profile identifiers, determining the first output data is to be presented before the second output data.

8. The computer-implemented method of claim 5, further comprising:
determining the first data is associated with a first expiration time;
determining the second data is associated with a second expiration time; and
based at least in part on the first expiration time and the second expiration time, determining the first output data is to be presented before the second output data.

9. The computer-implemented method of claim 5, further comprising:
determining a first output duration associated with the first content;
determining a second output duration associated with the second content; and
based at least in part on the first output duration and the second output duration, determining the first output data is to be presented before the second output data.

10. The computer-implemented method of claim 5, further comprising:
receiving system preference data representing a system preference to output the first content first with respect to a plurality of notifications; and
based at least in part on the system preference data, determining the first output data is to be presented before the second output data.

11. The computer-implemented method of claim 5, further comprising:
receiving user feedback data associated with outputting of previous ordered natural language summaries of notifications, the user feedback data representing a first notification type is to be output before a second notification type;
determining the first data corresponds to the first notification type;
determining the second data corresponds to the second notification type; and
based at least in part on the first data corresponding to the first notification type and the second data corresponding to the second notification type, determining the first output data is to be presented before the second output data.

12. The computer-implemented method of claim 5, wherein the first data is received from a first computing system, the second data is received from a second computing system, and the computer-implemented method further comprises:
determining the first computing system is associated with a first rating;
determining the second computing system is associated with a second rating; and
based at least in part on the first rating and the second rating, determining the first output data is to be presented before the second output data.

13. A computing system, comprising:
at least one processor; and
at least one memory comprising instructions that, when executed by the at least one processor, cause the computing system to:
receive first data representing a first notification associated with first content;
receive second data representing a second notification associated with second content that is different than the first content;
generate first output data corresponding to a first natural language summary of the first content;
generate second output data corresponding to a second natural language summary of the second content;
determine first rule data based on the first content corresponding to a first content type of the first rule data;
based at least in part on the first rule data, determine the first output data is to be presented before the second output data; and
cause the first output data to be presented before the second output data.

14. The computing system of claim 13, wherein the at least one memory further comprises instructions that, when executed by the at least one processor, further cause the computing system to:
after receiving the first data and the second data, receive audio data representing a spoken natural language input;
process the audio data to determine the spoken natural language input requests output corresponding to the first data and the second data; and
after determining the spoken natural language input requests the output, causing the first output data to be presented before the second output data.

15. The computing system of claim 14, wherein the at least one memory further comprises instructions that, when executed by the at least one processor, further cause the computing system to:
determine a user profile identifier associated with the audio data;
determine the first data is associated with a first user profile identifier;

determine the second data is associated with a plurality of user profile identifiers comprising the first user profile identifier; and based at least in part on the first data being associated with the first user profile identifier and the second data being associated with the plurality of user profile identifiers, determine the first output data is to be presented before the second output data.

16. The computing system of claim 13, wherein the at least one memory further comprises instructions that, when executed by the at least one processor, further cause the computing system to:

determine the first data is associated with a first expiration time;

determine the second data is associated with a second expiration time; and based at least in part on the first expiration time and the second expiration time, determine the first output data is to be presented before the second output data.

17. The computing system of claim 13, wherein the at least one memory further comprises instructions that, when executed by the at least one processor, further cause the computing system to:

determine a first output duration associated with the first content;

determine a second output duration associated with the second content; and based at least in part on the first output duration and the second output duration, determine the first output data is to be presented before the second output data.

18. The computing system of claim 13, wherein the at least one memory further comprises instructions that, when executed by the at least one processor, further cause the computing system to:

receive system preference data representing a system preference to output the first content first with respect to a plurality of notifications; and based at least in part on the system preference data, determine the first output data is to be presented before the second output data.

19. The computing system of claim 13, wherein the at least one memory further comprises instructions that, when executed by the at least one processor, further cause the computing system to:

receive user feedback data associated with outputting of previous ordered natural language summaries of notifications, the user feedback data representing a first notification type is to be output before a second notification type;

determine the first data corresponds to the first notification type;

determine the second data corresponds to the second notification type; and based at least in part on the first data corresponding to the first notification type and the second data corresponding to the second notification type, determine the first output data is to be presented before the second output data.

20. The computing system of claim 13, wherein the first data is received from a first computing system, the second data is received from a second computing system, and the at least one memory further comprises instructions that, when executed by the at least one processor, further cause the computing system to:

determine the first computing system is associated with a first rating;

determine the second computing system is associated with a second rating; and based at least in part on the first rating and the second rating, determine the first output data is to be presented before the second output data.

* * * * *